(12) United States Patent
Lu et al.

(10) Patent No.: US 9,450,861 B2
(45) Date of Patent: Sep. 20, 2016

(54) ETHERNET-COMPATIBLE METHOD AND SYSTEM

(75) Inventors: Dorian Lu, Shanghai (CN); Carl Yang, Beijing (CN)

(73) Assignee: BEIJING QIANTANG NETWORK TECHNOLOGY COMPANY, LTD. (CN)

( * ) Notice: Subject to any disclaimer, the term of this patent is extended or adjusted under 35 U.S.C. 154(b) by 644 days.

(21) Appl. No.: 13/814,729

(22) PCT Filed: Aug. 4, 2011

(86) PCT No.: PCT/CN2011/077988
§ 371 (c)(1),
(2), (4) Date: Apr. 15, 2013

(87) PCT Pub. No.: WO2012/016528
PCT Pub. Date: Feb. 9, 2012

(65) Prior Publication Data
US 2013/0205043 A1    Aug. 8, 2013

(30) Foreign Application Priority Data

Aug. 6, 2010  (CN) .......................... 2010 1 0248216

(51) Int. Cl.
G06F 15/173 (2006.01)
H04L 12/717 (2013.01)
(Continued)

(52) U.S. Cl.
CPC ........... H04L 45/42 (2013.01); H04L 12/4633 (2013.01); H04L 61/106 (2013.01); H04L 61/6022 (2013.01)

(58) Field of Classification Search
CPC . H04L 45/42; H04L 12/4633; H04L 61/106; H04L 61/6022
See application file for complete search history.

(56) References Cited

U.S. PATENT DOCUMENTS 6,711,162 B1 * 3/2004 Ortega .................... H04L 29/06
370/389
7,450,525 B2 * 11/2008 Son ......................... H04L 41/12
370/254
(Continued)

FOREIGN PATENT DOCUMENTS

CN    101047631 A    10/2007
CN    101075972 A    11/2007
(Continued)

OTHER PUBLICATIONS

First Office Action for Chinese App. No. 201010248216.1 dated Oct. 17, 2013, and English translation of Text of First Office action, 5 pages.
(Continued)

*Primary Examiner* — Ario Etienne
*Assistant Examiner* — Andrea Hurst
(74) *Attorney, Agent, or Firm* — Foley & Lardner LLP

(57) ABSTRACT

A new type of network is a network with centralized control function. An Ethernet protocol translation gateway can access the network and obtain from a node server therein MAC address of the Ethernet protocol translation gateway and the MAC address of terminals bound to the Ethernet protocol translation gateway. A data packet to be transmitted from the network to the Ethernet can be forwarded to a target terminal in the Ethernet according to the MACs of the terminals, by adding the MAC of the Ethernet protocol translation gateway and the MAC of the target terminal to the packet. For a data packet transmitted from the Ethernet to the network, the packet can be forwarded to the network according to the destination address of the network in the packet by means of removing from the packet the MAC of the Ethernet protocol translation gateway and the MAC of the target terminal.

14 Claims, 6 Drawing Sheets

(51) Int. Cl.
*H04L 12/46* (2006.01)
*H04L 29/12* (2006.01)

(56) References Cited

U.S. PATENT DOCUMENTS

| | | | | |
|---|---|---|---|---|
| 7,710,901 B2* | 5/2010 | Allan | H04L 12/4641 | 370/254 |
| 8,223,771 B2* | 7/2012 | Fang | H04W 28/06 | 370/328 |
| 8,804,749 B2* | 8/2014 | Jounay | H04L 45/00 | 370/235 |
| 9,007,916 B2* | 4/2015 | Maggiari | H04L 41/0226 | 370/236 |
| 9,083,656 B2* | 7/2015 | Lu | H04L 12/2856 | |
| 2004/0153556 A1* | 8/2004 | Claes | H04L 12/2859 | 709/229 |
| 2006/0034318 A1* | 2/2006 | Fernandes | H04L 12/2854 | 370/463 |
| 2006/0133299 A1* | 6/2006 | Son | H04L 41/12 | 370/254 |
| 2007/0086455 A1* | 4/2007 | Allan | H04L 12/4641 | 370/389 |
| 2009/0073998 A1* | 3/2009 | Allan | H04L 12/4625 | 370/401 |
| 2011/0116509 A1* | 5/2011 | Moreno | H04L 12/4625 | 370/401 |
| 2013/0170492 A1* | 7/2013 | Lu | H04L 12/4625 | 370/390 |
| 2013/0182608 A1* | 7/2013 | Maggiari | H04L 41/0226 | 370/254 |
| 2013/0201987 A1* | 8/2013 | Lu | H04L 12/2856 | 370/390 |
| 2013/0205043 A1* | 8/2013 | Lu | H04L 12/4633 | 709/244 |

FOREIGN PATENT DOCUMENTS

| | | |
|---|---|---|
| CN | 101197763 A | 6/2008 |
| CN | 101917492 A | 12/2010 |
| EP | 2020120 A2 | 2/2009 |

OTHER PUBLICATIONS

First Office Action for Chinese App. No. 201010248220.8 dated Oct. 14, 2013, and English translation of Text of First Office action, 5 pages.

* cited by examiner

| 8byte | 8byte | 2byte | | 4byte |
|---|---|---|---|---|
| DA | SA | Reserved | Payload | CRC |

| 6byte | 6byte | 2byte | 8byte | 8byte | 2byte | | 4byte |
|---|---|---|---|---|---|---|---|
| MAC DA | MAC SA | Length or frame type | DA | SA | Reserved | Payload | CRC |

ETHERNET-COMPATIBLE METHOD AND SYSTEM

FIELD OF THE INVENTION

The present invention relates to the field of communication technologies, and in particular, to an Ethernet-compatible data transmission method, an Ethernet protocol translation gateway, a node server and an Ethernet-compatible communication system.

BACKGROUND OF THE INVENTION

Communication networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and a network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as an industry standard, and no other technology, except for IP, has such a large potentiality and development space. (Abstracted from *IP Convergence: Building the Future*, by Susan Breidenbach, *Network World*, Aug. 10 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in e-mail sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before a communication starts, no circuit needs to be connected first, and respective packets will not necessarily be transmitted via one and the same route, so it is called "connectionless type". Such a feature is very important, and in the case of text information transmission, it greatly improves the robustness and security of the network.

Each data packet has two parts, which are header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than 1/1,000, the quality of video and audio will be lowered for synchronous video. Empirical data tells us that high-quality video communication even requires that packet loss and error code should be lower than 1/100,000. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst flow will be formed. Because the core concept of IP Internet is "Best Efforts", at each network node, the switch always tries its best to forward data at the highest speed. After a video stream passes multiple levels of switches, it will be certain that flow distribution becomes non-uniform. When multiple non-uniform and asynchronous streams are combined, greater non-uniformity will be generated in a period of time; that is, periodic congestion of network flow is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the flow of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection network management is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized in large-scale public networks.

Why can't "Light load" succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is flow non-uniformity. Macroscopically, when the sending speed is high in one time period, it is certain to cause jam in another time period; no upper limit can be given to the peak flow of the network so long as the network flow is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous flow will be tens of folds of that of HDTV, because most of the current web site servers use a Gigabit network interface. If the flows of a lot of similar web sites just collide, the burst flow generated in a certain short time will exceed the flow required by all network-wide users that use HDTV, and a network with any bandwidth can be occupied. As shown by statistical analysis, such a collision is frequent.

IP Internet tries to absorb the instantaneous flow by employing a memory, which causes the increase of transmission delay. The storage capacity is limited, but the burst flow has no upper limit; therefore, by employing the memory method, it can only improve the packet loss of the current device, and the burst flow absorbed at the current node will put much pressure on the next node. Video stream flow is ceaseless, and the storage mode of the switch intensifies the accumulation of the burst flow to a weak node, thus network packet loss is inevitable.

By employing light load plus "Diff Serv" technology, the current network constructors may deal with narrowband VoIP voice services. This is because voice does not occupy the main part of total flow on the network; once jam occurs, voice will take priority by sacrificing computer files. However, for high-bandwidth video communication, only temporary improvement can be obtained by partial expansion. If expansion is also carried out at other nodes, the non-uniformity of network flow will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

Ethernet technology is a networking technology for a computer local area network, which is the most prevalent local area network technology at present. It has replaced other local area network standards to a large extent, for example, token ring, FDDI and ARCNET. Ethernet employs a carrier sounding multi-access with collision detection (CSMA/CD) mechanism. All nodes in the Ethernet can see all the information transmitted in the network, and thus Ethernet is a broadcast network. Mostly, an Ethernet employs a star topology.

In an IP network connected to an Ethernet, most applications of the M network are oriented to connectionless and non-real time transmission; while for multimedia services such as video, etc., constant and real-time transmission is required. The essential conditions required by multimedia services are significantly different from the essential conditions required by traditional data services (for example, web page text, image, electronic mail, FTP and DNS service). Especially, multimedia services are particularly sensitive to end-to-end delay and delay variation, but it may tolerate accidental data loss. Such differences in service requirements indicate that the original communication network architecture designed for data transmission is not applicable to provide the multimedia services.

However, Ethernet is a local area network which is most widely used, and if the network structure connected to the local area network is totally replaced with another network which is applicable for multimedia service transmission, great manpower, financial resources and development resources will be consumed. However, the current IP network cannot meet the ever-growing multimedia transmission demands.

SUMMARY OF THE INVENTION

The technical problem to be solved by the present invention is to provide an Ethernet-compatible data transmission method, an Ethernet protocol translation gateway, a node server and an Ethernet-compatible communication system, thereby solving the problem of Ethernet compatibility.

In order to solve the above technical problems, the invention discloses an Ethernet-compatible data transmission method for a novel network, wherein the novel network is a network with a centralized control function, a terminal is connected to the novel network via an Ethernet, and the method comprises: accessing, by an Ethernet protocol translation gateway, the novel network, and obtaining an MAC address of a terminal bound to the Ethernet protocol translation gateway from a node server with a centralized control function; receiving, by the Ethernet protocol translation gateway, a data packet transmitted from the novel network, adding an MAC address of the Ethernet protocol translation gateway and an MAC address of a target terminal into the data packet, and then transmitting the data packet to the Ethernet; and receiving, by the Ethernet protocol translation gateway, a data packet transmitted from the Ethernet, removing the MAC address of the Ethernet protocol translation gateway and an MAC address of a source terminal from the data packet, and then transmitting the data packet to the novel network, wherein both the target terminal and the source terminal comply with novel network protocols.

In particular, the data packet, into which the MAC address of the Ethernet protocol translation gateway and the MAC address of the target terminal are added, is transmitted in the Ethernet by using Ethernet protocols; and the data packet, from which the MAC address of the Ethernet protocol translation gateway and the MAC address of the source terminal are removed, is transmitted in the novel network by using the novel network protocols.

In order to achieve compatibility, packet headers of the data packet transmitted from the novel network and the data packet transmitted from the Ethernet both contain addresses of two transmitting ends in the novel network, wherein the addresses are a source address and a destination address of the data packet. After the Ethernet protocol translation gateway accesses the novel network, the method further comprises: obtaining, from the node server, a mapping between the MAC address of the terminal bound to the Ethernet protocol translation gateway and an address of the terminal in the novel network; and receiving, by the Ethernet protocol translation gateway, the data packet transmitted from the novel network, and adding an MAC address of a corresponding target terminal into the data packet according to a mapping between the destination address of the data packet and the MAC address.

The network access processes of the Ethernet protocol translation gateway and the terminal will be described below respectively.

Accessing, by the Ethernet protocol translation gateway, the novel network comprises: issuing, by a node server with a centralized control function in the novel network, a query packet; receiving, by the Ethernet protocol translation gateway, the query packet after being powered on and initialized, and returning a reply packet containing a serial number of the Ethernet protocol translation gateway; looking up, by the node server, information of the Ethernet protocol translation gateway corresponding to the serial number in a registration information table, wherein the information of the Ethernet protocol translation gateway includes the MAC address of the Ethernet protocol translation gateway and the MAC address of the terminal bound to the Ethernet protocol translation gateway; transmitting, by the node server, a network access command to the Ethernet protocol translation gateway, wherein the network access command contains an address of the Ethernet protocol translation gateway in the novel network and the MAC address of the Ethernet protocol translation gateway; and returning, by the Ethernet protocol translation gateway, a reply after receiving the network access command, and accessing, by the Ethernet protocol translation gateway, the novel network.

After the Ethernet protocol translation gateway accesses the novel network, the node server notifies the Ethernet protocol translation gateway of the MAC address of the terminal bound to the Ethernet protocol translation gateway, wherein binding relation between the MAC address of the terminal and the Ethernet protocol translation gateway is preset in the node server when the terminal and the Ethernet protocol translation gateway are sold.

After receiving, by the Ethernet protocol translation gateway, the network access command, the method further comprises: setting a protocol packet address table in the Ethernet protocol translation gateway, wherein the table is adapted to orient protocol packets received by the Ethernet protocol translation gateway to corresponding ports of the Ethernet protocol translation gateway respectively, wherein the protocol packet includes the query packet issued by the node server.

After the Ethernet protocol translation gateway accesses the novel network and obtains the MAC address of the Ethernet protocol translation gateway and the MAC address of the terminal bound to the Ethernet protocol translation gateway, the terminal bound to the Ethernet protocol translation gateway accesses the novel network, which specifically comprises the following steps: issuing, by a node server with a centralized control function in the novel network, a query packet; receiving, by the Ethernet protocol translation gateway, the query packet, orienting the query packet to a corresponding port according to the protocol packet address table, and then adding the MAC address of the Ethernet protocol translation gateway and the MAC address of the target terminal into the query packet and forwarding the query packet; receiving, by the terminal, the query packet after being powered on and initialized, and returning a reply packet containing a serial number of the terminal; removing, by the Ethernet protocol translation gateway, the MAC address of the Ethernet protocol translation gateway and the MAC address of the terminal from the reply packet, and then forwarding the reply packet to the node server; finding, by the node server, in the registration information table, terminal information corresponding to the serial number of the terminal, and transmitting a network access command, wherein the network access command contains the address of the terminal in the novel network; receiving, by the Ethernet protocol translation gateway, the network access command, adding the MAC address of the Ethernet protocol translation gateway and the MAC address of the target terminal, and then forwarding the network access command; and returning, by the terminal, a reply after receiving the network access command, removing, by the Ethernet protocol translation gateway, the MAC address of the Ethernet protocol translation gateway and the MAC address of the terminal from the reply and then forwarding the reply to the node server, and accessing, by the terminal, the novel network.

After accessing the novel network, the Ethernet protocol translation gateway can add or subtract MAC for the protocol packet. For example, for a service request protocol packet initiated by the source terminal, the packet contains the MAC address of the Ethernet protocol translation gateway and the MAC address of the source terminal; and the Ethernet protocol translation gateway removes the MAC address of the Ethernet protocol translation gateway and the MAC address of the source terminal from the service request protocol packet and then forwards the service request protocol packet to the novel network.

After accessing the novel network, the Ethernet protocol translation gateway can set its own data packet address table, which specifically comprises: acquiring, by the node server, uplink and downlink transmission paths for the service according to the service request protocol packet, and transmitting configuration information of the uplink and downlink transmission paths to Ethernet protocol translation gateways on the uplink and downlink transmission paths respectively; and setting, by the Ethernet protocol translation gateways on the uplink and downlink transmission paths, their respective data packet address tables according to the configuration information, wherein the data packet address tables are adapted to orient data packets received by the Ethernet protocol translation gateways to corresponding ports.

Wherein when data transmission is unidirectional transmission, the Ethernet protocol translation gateway bound to the source terminal sets a data packet address table for uplink transmission, and the Ethernet protocol translation gateway bound to the target terminal sets a data packet address table for downlink transmission; or when data transmission is bidirectional transmission, the Ethernet protocol translation gateway bound to the source terminal sets a data packet address table for uplink and downlink transmission, and the Ethernet protocol translation gateway bound to the target terminal also sets a data packet address table for uplink and downlink transmission.

The data packet address table is used as follows: the Ethernet protocol translation gateway receives the data packet transmitted from the novel network, queries the data packet address table, orients the data packet to a corresponding port, and adds the MAC address of the Ethernet protocol translation gateway and the MAC address of the target terminal and then transmits the data packet; and the Ethernet protocol translation gateway receives the data packet transmitted from the Ethernet, removes the MAC address of the Ethernet protocol translation gateway and the MAC address of the source terminal from the data packet, queries the data packet address table, orients the data packet to a corresponding port and then transmits the data packet.

In particular, when access switches of the novel network are further included between the node server and the Ethernet protocol translation gateway, the node server transmits the configuration information of the transmission paths to the access switches on the uplink and downlink transmission paths, and the access switches set their respective data packet address tables according to the configuration information, wherein the data packet address tables are adapted to orient data packets received by the access switches to corresponding ports.

In the above process, the node server can acquire the uplink and downlink transmission paths for the service by the following way: maintaining, by the node server, an address information table, in which novel network address occupation information, device description information and device resource description information are recorded, wherein the device resource description information includes novel network addresses of devices connected to respective network ports of the device; and acquiring, by the node server, the uplink and downlink transmission paths corresponding to the service according to the novel addresses of the devices connected to respective network ports of the device in the address information table. In particular, if the node server obtains multiple uplink or downlink transmission paths for the service, the node server selects one transmission path therefrom according to a preset rule. After completing the service, the node server modifies contents in the address information table, wherein the modifying includes: updating the address occupation information in a corresponding item as not occupied, and releasing the corresponding device description information and device resource description information.

The process of accessing the novel network by the access switch comprises: issuing, by a node server with a centralized control function in the novel network, a query packet; receiving, by the access switch, the query packet after being powered on and initialized, and returning a reply packet containing a serial number of the access switch; looking up, by the node server, in the registration information table, access switch information corresponding to the serial number, and transmitting a network access command, wherein the network access command contains an address of the access switch in the novel network; and returning, by the access switch, a reply after receiving the network access command, and accessing the novel network.

Through the above contents, the novel network and the Ethernet achieve the good compatibility via the Ethernet protocol translation gateway. Moreover, the Ethernet protocol translation gateway further has the functions of the above access switch, for example, it can achieve precise flow control, and the particular implementation is as follows:

After receiving, by the Ethernet protocol translation gateway, the data packet transmitted from the Ethernet and before removing the MAC address of the Ethernet protocol translation gateway and the MAC address of the source terminal from the data packet, the method further comprises: detecting the received data packet, and allocating a corresponding stream identifier if detection requirements are met. Wherein the detecting can be detecting whether the MAC address of the Ethernet protocol translation gateway, the MAC address of the source terminal, the destination address, the source address, data packet type and packet length meet requirements.

Furthermore, after removing, by the Ethernet protocol translation gateway, the MAC address of the Ethernet protocol translation gateway and the MAC address of the source terminal from the data packet and before transmitting the data packet, the method further comprises: putting the data packet into a corresponding port receive buffer according to the stream identifier; reading the data packet from the port receive buffer, and putting the data packet into a packet buffer queue of corresponding stream according to the stream identifier; polling the packet buffer queue, and after generating a transmitting token, reading sequentially data packets from the packet buffer queue of the corresponding stream according to a stream identifier in the transmitting token, and putting the data packets into a port transmit buffer; and reading a data packet from the port transmit buffer, and transmitting the data packet.

Moreover, the Ethernet protocol translation gateway can further judge whether the following two conditions are met simultaneously: firstly, the port transmit buffer is not full, and secondly, count of a packet counter in the packet buffer queue of the corresponding stream is larger than zero; and read sequentially the data packets from the packet buffer queue of the corresponding stream according to the stream identifier in the transmitting token, and put the data packets into the port transmit buffer, if the two conditions are meet simultaneously.

In the above flow control process, the transmitting token is generated in the following way: generating, by a node server with a centralized control function in the novel network, flow control information according to the service request protocol packet initiated by the terminal, and transmitting the flow control information to an uplink Ethernet protocol translation gateway for flow control, wherein the flow control information includes a transmitting time interval and transmitted data size; and generating, by the Ethernet protocol translation gateway, the transmitting token according to the flow control information, wherein the token contains a stream identifier. Preferably, the transmitted data size in the flow control information includes a maximum value of bytes which can be transmitted and parameters for adjusting the transmitting of a packet with variable length.

More particularly, the node server generates the flow control information in the following way:

Maintaining, by the node server, an address information table, in which novel network address occupation information, device description information and device resource description information are recorded, wherein the device resource description information includes novel network addresses of devices connected to respective network ports of the device and uplink and downlink flow count of the respective network ports of the device; and obtaining, by the node server, the uplink and downlink corresponding to the service according to the novel network addresses of the devices connected to the respective network ports of the device in the address information table; and obtaining the remaining flow resources of the uplink and downlink for the service according to the uplink and downlink flow count of the respective network ports of the device. Checking, by the node server, whether remaining flow resources of the uplink and downlink for the service both meet flow resources required by the service, if so, generating flow control information corresponding to the service; otherwise, rejecting the service request.

Moreover, the node server can further perform the flow control on the protocol packet, which specifically comprises: receiving, by the Ethernet protocol translation gateway, a service request protocol packet, detecting the MAC address of the Ethernet protocol translation gateway, the MAC address of the source terminal, the destination address, the source address, data packet type and packet length for the service request protocol packet, and putting the service request protocol packet into a corresponding port receive buffer if detection requirements are met; reading a protocol packet from the port receive buffer, and putting the protocol packet into a corresponding packet buffer queue; polling the packet buffer queue, and if a port transmit buffer is not full and count of a packet counter in the packet buffer queue is larger than zero, reading sequentially protocol packets from the packet buffer queue at a predefined time interval and putting the protocol packets into the port transmit buffer; and reading a protocol packet from the port transmit buffer, and transmitting the protocol packet.

The invention further provides an Ethernet-compatible Ethernet protocol translation gateway for a novel network, wherein the Ethernet protocol translation gateway accesses the novel network and is connected with a terminal via an Ethernet, the novel network is a network with a centralized control function, and the Ethernet protocol translation gateway comprises:

an MAC acquiring module configured for obtaining an MAC address of a terminal bound to the Ethernet protocol translation gateway from a node server with a centralized control function after accessing the novel network;

an MAC adding module configured for receiving a data packet transmitted from the novel network, adding an MAC address of the Ethernet protocol translation gateway and an MAC address of a target terminal into the data packet, and then transmitting the data packet to the Ethernet; and an MAC deleting module configured for receiving a data packet transmitted from the Ethernet, removing the MAC address of the Ethernet protocol translation gateway and an MAC address of a source terminal from the data packet, and then transmitting the data packet to the novel network, wherein both the target terminal and the source terminal comply with novel network protocols.

In particular, the data packet, into which the MAC address of the Ethernet protocol translation gateway and the MAC address of the target terminal are added, is transmitted in the Ethernet by using Ethernet protocols; and the data packet, from which the MAC address of the Ethernet protocol translation gateway and the MAC address of the source terminal are removed, is transmitted in the novel network by using the novel network protocols.

In order to achieve compatibility, packet headers of the data packet transmitted from the novel network and the data packet transmitted from the Ethernet both contain addresses of two transmitting ends in the novel network, wherein the addresses are a source address and a destination address of the data packet. Accordingly, the Ethernet protocol translation gateway further comprises: a mapping relation acquiring module configured for obtaining, from the node server, a mapping between the MAC address of the terminal bound to the Ethernet protocol translation gateway and an address of the terminal in the novel network after the Ethernet protocol translation gateway accesses the novel network; and then the MAC adding module receives the data packet transmitted from the novel network, and adding an MAC address of a corresponding target terminal into the data packet according to a mapping between the destination address of the data packet and the MAC address.

Wherein the MAC acquiring module comprises the following module used to achieve network access:

a query packet receiving submodule configured for receiving, after being powered on and initialized, a query packet issued by the node server;

a query replying submodule configured for returning a reply packet containing a serial number of the Ethernet protocol translation gateway;

a network access command receiving submodule configured for receiving a network access command transmitted from the node server after the node server finds information of the Ethernet protocol translation gateway corresponding to the serial number in a registration information table, wherein the information of the Ethernet protocol translation gateway includes the MAC address of the Ethernet protocol translation gateway and the MAC address of the terminal bound to the Ethernet protocol translation gateway, and the network access command contains an address of the Ethernet protocol translation gateway in the novel network and the MAC address of the Ethernet protocol translation gateway; and a network access replying submodule configured for returning a reply after receiving the network access command, and accessing the Ethernet protocol translation gateway in the novel network.

The MAC acquiring module further comprises: a terminal MAC acquiring submodule configured for receiving, after accessing the novel network, the MAC address of the terminal bound to the Ethernet protocol translation gateway transmitted from the node server. Wherein binding relation between the MAC address of the terminal and the Ethernet protocol translation gateway is preset in the node server when the terminal and the Ethernet protocol translation gateway are sold.

The Ethernet protocol translation gateway is set with a protocol packet address table, and accordingly further comprises: a protocol packet address table configuring module configured for setting a protocol packet address table in the Ethernet protocol translation gateway after receiving the network access command, wherein the table is adapted to orient protocol packets received by the Ethernet protocol translation gateway to corresponding ports of the Ethernet protocol translation gateway respectively, wherein the protocol packet includes the query packet issued by the node server. Accordingly, the Ethernet protocol translation gateway further comprises: a query packet orienting module configured for receiving the query packet issued by the node server and orienting the query packet to a corresponding port according to the protocol packet address table during the process in which the terminal bound to the Ethernet protocol translation gateway accesses the novel network.

Accordingly, the MAC adding module is further configured for adding the MAC address of the Ethernet protocol translation gateway and the MAC address of the target terminal into the query packet and forwarding the query packet; the MAC deleting module is further configured for, after the terminal receives the query packet and returns a reply packet containing a serial number of the terminal when being powered on and initialized, removing the MAC address of the Ethernet protocol translation gateway and the MAC address of the terminal from the reply packet and then forwarding the reply packet to the node server; the MAC adding module is further configured for, after the node server finds terminal information corresponding to the serial number of the terminal in the registration information table and transmits a network access command containing the address of the terminal in the novel network, adding the MAC address of the Ethernet protocol translation gateway and the MAC address of the target terminal into the network access command and forwarding the network access command; and the MAC deleting module is further configured for, after the terminal receives the network access command and returns a reply, removing the MAC address of the Ethernet protocol translation gateway and the MAC address of the terminal from the reply and forwarding the reply to the node server. The MAC deleting module is further configured for, after the source terminal initiates a service request protocol packet, removing the MAC address of the Ethernet protocol translation gateway and the MAC address of the source terminal from the service request protocol packet and forwarding the service request protocol packet to the novel network.

The Ethernet protocol translation gateway is set with a data packet address table, and accordingly, it further comprises: a data packet address table configuring module configured for, after the node server acquires uplink and downlink transmission paths for the service according to the service request protocol packet and transmits configuration information of the uplink and downlink transmission paths to Ethernet protocol translation gateways on the uplink and downlink transmission paths respectively, setting respective data packet address tables according to the configuration information, wherein the data packet address tables are adapted to orient data packets received by the Ethernet protocol translation gateways to corresponding ports.

Wherein when data transmission is unidirectional transmission, the data packet address table configuring module in the Ethernet protocol translation gateway bound to the source terminal sets a data packet address table for uplink transmission, and the data packet address table configuring module in the Ethernet protocol translation gateway bound to the target terminal sets a data packet address table for downlink transmission; or when data transmission is bidirectional transmission, the data packet address table configuring module in the Ethernet protocol translation gateway bound to the source terminal sets a data packet address table for uplink and downlink transmission, and the data packet address table configuring module in the Ethernet protocol translation gateway bound to the target terminal also sets a data packet address table for uplink and downlink transmission.

Accordingly, the Ethernet protocol translation gateway further comprises: a data packet orienting module configured for, after receiving a data packet transmitted from the novel network, querying the data packet address table and orienting the data packet to a corresponding port, and transmitting the data packet after the MAC adding module adds the MAC address of the Ethernet protocol translation gateway and the MAC address of the target terminal; and further configured for, after receiving a data packet transmitted from the Ethernet and the MAC deleting module removes the MAC address of the Ethernet protocol translation gateway and the MAC address of the source terminal from the data packet, querying the data packet address table, and orienting the data packet to a corresponding port and then transmitting the data packet.

The Ethernet protocol translation gateway further has a function of controlling flow precisely, and the specific implementation is as follows:

The Ethernet protocol translation gateway further comprises: a packet detecting module configured for detecting the received data packet, and allocating a corresponding stream identifier if detection requirements are met. Wherein the packet detecting module can detect whether the MAC address of the Ethernet protocol translation gateway, the MAC address of the source terminal, the destination address, the source address, data packet type and packet length meet requirements.

The Ethernet protocol translation gateway further comprises: a port receive buffer configured for storing a corresponding data packet according to the stream identifier;

a packet buffer configured for storing a data packet read from the port receive buffer;

a port transmit buffer configured for storing a data packet read from the packet buffer; and a switching engine configured for reading a data packet from the port receive buffer and putting the data packet into a packet buffer queue of corresponding stream according to the stream identifier; polling the packet buffer queue, and after obtaining a transmitting token, reading sequentially data packets from the packet buffer queue of the corresponding stream according to the stream identifier in the transmitting token, and putting the data packets into the port transmit buffer; and reading a data packet from the port transmit buffer and transmitting the data packet.

Moreover, the switching engine is further configured for judging whether the following two conditions are met simultaneously: firstly, the port transmit buffer is not full, and secondly, count of a packet counter in the packet buffer queue of the corresponding stream is larger than zero; and reading sequentially the data packets from the packet buffer queue of the corresponding stream according to the stream identifier in the transmitting token, and putting the data packets into the port transmit buffer, if the two conditions are meet simultaneously.

The Ethernet protocol translation gateway further comprises: a CPU module configured for obtaining flow control information for each service from the node server, wherein the flow control information includes a transmitting time interval and transmitted data size.

The Ethernet protocol translation gateway further comprises: a code rate control module which is configured by the CPU module and configured for generating the transmitting token according to the flow control information and transmitting the transmitting token to the switching engine, wherein the token contains the stream identifier. Wherein the transmitted data size in the flow control information includes a maximum value of bytes which can be transmitted and parameters for adjusting the transmitting of a packet with variable length.

The Ethernet protocol translation gateway can not only perform flow control on the data packet, but also perform flow control on the protocol packet, and the implementation is as follows:

the packet detecting module is further configured for detecting the MAC address of the Ethernet protocol translation gateway, the MAC address of the source terminal, the destination address, the source address, data packet type and packet length for the received service request protocol packet, and putting the service request protocol packet into the corresponding port receive buffer if detection requirements are met;

the port receive buffer is further configured for storing a protocol packet;

the packet buffer is further configured for storing a protocol packet read from the port receive buffer;

the port transmit buffer is further configured for storing a protocol packet read from the packet buffer; and the switching engine is further configured for reading a protocol packet from the port receive buffer and putting the protocol packet into a packet buffer queue of corresponding stream; polling the packet buffer queue, reading sequentially protocol packets from the packet buffer queue at a predefined time interval, and putting the protocol packets into the port transmit buffer if the port transmit buffer is not full and count of a packet counter in the packet buffer queue is larger than zero; and reading a protocol packet from the port transmit buffer and transmitting the protocol packet.

The invention further provides an Ethernet-compatible node server for a novel network, wherein the node server has a centralized control function in the novel network, and the node server comprises:

an MAC binding relation table configured for recording an MAC address of an Ethernet protocol translation gateway and an MAC address of a terminal bound to the Ethernet protocol translation gateway;

an MAC mapping table configured for recording a mapping between novel network addresses and MAC addresses;

an MAC transmitting module configured for, when the Ethernet protocol translation gateway accesses the novel network, transmitting a novel network address of the Ethernet protocol translation gateway, the MAC address of the terminal bound to the Ethernet protocol translation gateway and a novel network address corresponding to the terminal to the Ethernet protocol translation gateway which has accessed the network according to the MAC binding relation table and the MAC mapping table.

Wherein the MAC address of the Ethernet protocol translation gateway can be transmitted by the MAC transmitting module to the Ethernet protocol translation gateway which has accessed the network; or the MAC address is solidified in the Ethernet protocol translation gateway, and at this time, it is not required to obtain the MAC address from the node server.

The node server contributes the centralized control function in the novel network, and the specific implementation is as follows:

Firstly, the node server further comprises: a path configuring module configured for acquiring uplink and downlink transmission paths for the service according to a service request protocol packet, and transmitting configuration information of the uplink and downlink transmission paths to Ethernet protocol translation gateways on the uplink and downlink transmission paths respectively; and the Ethernet protocol translation gateways on the uplink and downlink transmission paths set their respective data packet address tables according to the configuration information, wherein the data packet address tables are adapted to orient data packets received by the Ethernet protocol translation gateways to corresponding ports.

Secondly, the node server further comprises: an address information table configured for recording novel network address occupation information, device description information and device resource description information, wherein the device resource description information includes novel network addresses of devices connected to respective network ports of the device and uplink and downlink flow count of the respective network ports of the device.

Thirdly, the node server further comprises: a transmission path acquiring module configured for looking up, in the address information table, the novel network addresses of the devices connected to the respective network ports of the device according to the service request protocol packet initiated by the terminal, and obtaining the uplink and downlink transmission paths corresponding to the service. If the transmission path acquiring module obtains multiple uplink or downlink transmission paths for the service, the node server selects one transmission path therefrom according to a preset rule.

Fourthly, the node server further comprises: a flow calculating module configured for obtaining remaining flow resources of the uplink and downlink for the service according to the uplink and downlink flow count of the respective network ports of the device in the address information table.

Fifthly, the node server further comprises: a flow control module configured for checking whether the remaining flow resources of the uplink and downlink for the service both meet flow resources required by the service, if so, generating flow control information corresponding to the service and transmitting the flow control information to an uplink Ethernet protocol translation gateway for flow control or a first switch of the access terminal; otherwise, rejecting the service request, wherein the flow control information includes a transmitting time interval, a maximum value of bytes which can be transmitted and parameters for adjusting the transmitting of a packet with variable length.

The invention further provides an Ethernet-compatible communication system for a novel network, wherein the novel network is a network with a centralized control function, and the communication system comprises:

a node server, which has a centralized control function in the novel network and configured for transmitting an MAC address of a terminal bound to an Ethernet protocol translation gateway to the Ethernet protocol translation gateway which has accessed the network;

the Ethernet protocol translation gateway, which is connected with the terminal via an Ethernet and comprises:

an MAC acquiring module configured for accessing the novel network and obtaining the MAC address of the terminal bound to the Ethernet protocol translation gateway from the node server with the centralized control function;

an MAC adding module configured for receiving a data packet transmitted from the novel network, adding an MAC address of the Ethernet protocol translation gateway and an MAC address of a target terminal into the data packet, and then transmitting the data packet to the Ethernet; and an MAC deleting module configured for receiving a data packet transmitted from the Ethernet, removing the MAC address of the Ethernet protocol translation gateway and an MAC address of a source terminal from the data packet, and then transmitting the data packet to the novel network;

wherein both the target terminal and the source terminal comply with novel network protocols; and the terminal, which is connected in the Ethernet, is connected to the novel network via the Ethernet, and is bound to the Ethernet protocol translation gateway.

In particular, the data packet, into which the MAC address of the Ethernet protocol translation gateway and the MAC address of the target terminal are added, is transmitted in the Ethernet by using Ethernet protocols; and the data packet, from which the MAC address of the Ethernet protocol translation gateway and the MAC address of the source terminal are removed, is transmitted in the novel network by using the novel network protocols.

In order to achieve compatibility, packet headers of the data packet transmitted from the novel network and the data packet transmitted from the Ethernet both contain addresses of two transmitting ends in the novel network, wherein the addresses are a source address and a destination address of the data packet. Accordingly, the Ethernet protocol translation gateway further comprises: a mapping relation acquiring module configured for obtaining, from the node server, a mapping between the MAC address of the terminal bound to the Ethernet protocol translation gateway and an address of the terminal in the novel network after the Ethernet protocol translation gateway accesses the novel network; and then the MAC adding module receives the data packet transmitted from the novel network, and adding an MAC address of a corresponding target terminal into the data packet according to a mapping between the destination address of the data packet and the MAC address.

In order to achieve network access, the MAC acquiring module of the Ethernet protocol translation gateway comprises:

a query packet receiving submodule configured for receiving, after being powered on and initialized, a query packet issued by the node server;

a query replying submodule configured for returning a reply packet containing a serial number of the Ethernet protocol translation gateway;

a network access command receiving submodule configured for receiving the network access command transmitted from the node server; and a network access replying submodule configured for returning a reply after receiving the network access command, and accessing the Ethernet protocol translation gateway in the novel network.

The node server is further configured for looking up, in a registration information table, information of the Ethernet protocol translation gateway corresponding to the serial number, wherein the information of the Ethernet protocol translation gateway includes the MAC address of the Ethernet protocol translation gateway and the MAC address of the terminal bound to the Ethernet protocol translation gateway; and transmitting a network access command to the Ethernet protocol translation gateway, wherein the network access command contains an address of the Ethernet protocol translation gateway in the novel network and the MAC address of the Ethernet protocol translation gateway.

The MAC acquiring module of the Ethernet protocol translation gateway further comprises: a terminal MAC acquiring submodule configured for receiving, after accessing the novel network, the MAC address of the terminal bound to the Ethernet protocol translation gateway transmitted from the node server. Wherein binding relation between the MAC address of the terminal and the Ethernet protocol translation gateway is preset in the node server when the terminal and the Ethernet protocol translation gateway are sold.

The communication system achieves the data transmission by looking up tables, and the specific implementation is as follows:

Firstly, the Ethernet protocol translation gateway is set with a protocol packet address table, and accordingly the Ethernet protocol translation gateway further comprises: a protocol packet address table configuring module configured for setting a protocol packet address table in the Ethernet protocol translation gateway after receiving the network access command, wherein the table is adapted to orient protocol packets received by the Ethernet protocol translation gateway to corresponding ports of the Ethernet protocol translation gateway respectively, wherein the protocol packet includes the query packet issued by the node server. Accordingly, the Ethernet protocol translation gateway further comprises: a query packet orienting module configured for receiving the query packet issued by the node server and orienting the query packet to a corresponding port according to the protocol packet address table during the process in which the terminal bound to the Ethernet protocol translation gateway accesses the novel network.

Accordingly, the MAC adding module is further configured for adding the MAC address of the Ethernet protocol translation gateway and the MAC address of the target terminal into the query packet and forwarding the query packet; the MAC deleting module is further configured for, after the terminal receives the query packet and returns a reply packet containing a serial number of the terminal when being powered on and initialized, removing the MAC address of the Ethernet protocol translation gateway and the MAC address of the terminal from the reply packet and then forwarding the reply packet to the node server. The node server is further configured for looking up, in the registration information table, terminal information corresponding to the serial number of the terminal, and transmitting a network access command, wherein the network access command contains the address of the terminal in the novel network. The MAC adding module is further configured for adding the MAC address of the Ethernet protocol translation gateway and the MAC address of the target terminal into the network access command and forwarding the network access command; and the MAC deleting module is further configured for, after the terminal receives the network access command and returns a reply, removing the MAC address of the Ethernet protocol translation gateway and the MAC address of the terminal from the reply and forwarding the reply to the node server.

Secondly, in the process of setting up service, the MAC deleting module is further configured for, after the source terminal initiates a service request protocol packet, removing the MAC address of the Ethernet protocol translation gateway and the MAC address of the source terminal from the service request protocol packet and forwarding the service request protocol packet to the novel network. The node server is further configured for acquiring uplink and downlink transmission paths for the service according to the service request protocol packet, and transmitting configuration information of the uplink and downlink transmission paths to Ethernet protocol translation gateways on the uplink and downlink transmission paths respectively.

The Ethernet protocol translation gateway is set with a data packet address table, and accordingly, it further comprises: a data packet address table configuring module configured for setting data packet address tables according to the configuration information of the transmission paths, wherein the data packet address tables are adapted to orient data packets received by the Ethernet protocol translation gateways to corresponding ports.

When data transmission is unidirectional transmission, the data packet address table configuring module in the Ethernet protocol translation gateway bound to the source terminal sets a data packet address table for uplink transmission, and the data packet address table configuring module in the Ethernet protocol translation gateway bound to the target terminal sets a data packet address table for downlink transmission; or when data transmission is bidirectional transmission, the data packet address table configuring module in the Ethernet protocol translation gateway bound to the source terminal sets a data packet address table for uplink and downlink transmission, and the data packet address table configuring module in the Ethernet protocol translation gateway bound to the target terminal also sets a data packet address table for uplink and downlink transmission.

Accordingly, the Ethernet protocol translation gateway further comprises: a data packet orienting module configured for, after receiving a data packet transmitted from the novel network, querying the data packet address table and orienting the data packet to a corresponding port, and transmitting the data packet after the MAC adding module adds the MAC address of the Ethernet protocol translation gateway and the MAC address of the target terminal; and further configured for, after receiving a data packet transmitted from the Ethernet and the MAC deleting module removes the MAC address of the Ethernet protocol translation gateway and the MAC address of the source terminal from the data packet, querying the data packet address table, and orienting the data packet to a corresponding port and then transmitting the data packet.

Moreover, the communication system further comprises: an access switch, which is connected between the node server and the Ethernet protocol translation gateway. Accordingly, the node server is further configured for transmitting the configuration information of the transmission paths to the access switches on the uplink and downlink transmission paths. The access switch is configured for setting a data packet address table according to the configuration information of the transmission paths, wherein the data packet address table is adapted to orient a data packet received by the access switch to a corresponding port.

The node server has the centralized control function, and the specific implementation is as follows:

The node server is further configured for maintaining an address information table, in which novel network address occupation information, device description information and device resource description information are recorded, wherein the device resource description information includes novel network addresses of devices connected to respective network ports of the device; and the node server acquires the uplink and downlink transmission paths corresponding to the service according to the novel network addresses of the devices connected to respective network ports of the device in the address information table. If the node server obtains multiple uplink or downlink transmission paths for the service, the node server selects one transmission path therefrom according to a preset rule. The node server is further configured for, after completing the service, modifying contents in the address information table, wherein the modifying includes: updating the address occupation information in a corresponding item as not occupied, and releasing the corresponding device description information and device resource description information.

In order to achieve network access, the access switch comprises:

a query packet receiving module configured for receiving, after being powered on and initialized, a query packet issued by the node server;

a query replying module configured for receiving the query packet and returning a reply packet containing a serial number of the access switch, wherein the node server is further configured for looking up, in the registration information table, access switch information corresponding to the serial number, and transmitting a network access command, wherein the network access command contains an address of the access switch in the novel network;

a network access command receiving module configured for receiving the network access command issued by the node server; and a network access replying module configured for returning a reply after receiving the network access command and accessing the access switch in the novel network.

The Ethernet protocol translation gateway further has a function of controlling flow precisely, and the specific implementation is as follows:

Firstly, the Ethernet protocol translation gateway further comprises: a packet detecting module configured for detecting the received data packet, and allocating a corresponding stream identifier if detection requirements are met. The packet detecting module can detect whether the MAC address of the Ethernet protocol translation gateway, the MAC address of the source terminal, the destination address, the source address, data packet type and packet length meet requirements.

Secondly, the Ethernet protocol translation gateway further comprises: a port receive buffer configured for storing a corresponding data packet according to the stream identifier;

a packet buffer configured for storing a data packet read from the port receive buffer, a port transmit buffer configured for storing a data packet read from the packet buffer; and a switching engine configured for reading a data packet from the port receive buffer and putting the data packet into a packet buffer queue of corresponding stream according to the stream identifier; polling the packet buffer queue, and after obtaining a transmitting token, reading sequentially data packets from the packet buffer queue of the corresponding stream according to the stream identifier in the transmitting token, and putting the data packets into the port transmit buffer; and reading a data packet from the port transmit buffer and transmitting the data packet.

Wherein the switching engine is further configured for judging whether the following two conditions are met simultaneously: firstly, the port transmit buffer is not full, and secondly, count of a packet counter in the packet buffer queue of the corresponding stream is larger than zero; and reading sequentially the data packets from the packet buffer queue of the corresponding stream according to the stream identifier in the transmitting token, and putting the data packets into the port transmit buffer, if the two conditions are meet simultaneously.

The centralized control function of the node server is further embodied as follows:

Firstly, the node server is further configured for, according to the service request protocol packet initiated by the terminal, checking whether remaining flow resources of the uplink and downlink for the service both meet flow resources required by the service, if so, generates flow control information corresponding to the service; otherwise, rejects the service request. The node server transmits the generated flow control information to an uplink Ethernet protocol translation gateway for flow control, wherein the flow control information includes a transmitting time interval and transmitted data size. Wherein the transmitted data size in the flow control information includes a maximum value of bytes which can be transmitted and parameters for adjusting the transmitting of a packet with variable length.

Secondly, the node server is further set with an address information table, in which novel network address occupation information, device description information and device resource description information are recorded, wherein the device resource description information includes novel network addresses of devices connected to respective network ports of the device and uplink and downlink flow count of the respective network ports of the device; and the node server obtains the uplink and downlink corresponding to the service according to the novel network addresses of the devices connected to the respective network ports of the device in the address information table; and obtaining the remaining flow resources of the uplink and downlink for the service according to the uplink and downlink flow count of the respective network ports of the device.

The flow control function of the Ethernet protocol translation gateway is further embodied as follows:

The Ethernet protocol translation gateway further comprises: a CPU module configured for obtaining flow control information for each service from the node server;

The Ethernet protocol translation gateway further comprises: a code rate control module which is configured by the CPU module and configured for generating the transmitting token according to the flow control information and transmitting the transmitting token to the switching engine, wherein the token contains the stream identifier.

Moreover, for the flow control of the protocol packet, the packet detecting module is further configured for detecting the MAC address of the Ethernet protocol translation gateway, the MAC address of the source terminal, the destination address, the source address, data packet type and packet length for the received service request protocol packet, and putting the service request protocol packet into the corresponding port receive buffer if detection requirements are met; the port receive buffer is further configured for storing a protocol packet; the packet buffer is further configured for storing a protocol packet read from the port receive buffer; the port transmit buffer is further configured for storing a protocol packet read from the packet buffer; and the switching engine is further configured for reading a protocol packet from the port receive buffer and putting the protocol packet into a packet buffer queue of corresponding stream; polling the packet buffer queue, reading sequentially protocol packets from the packet buffer queue at a predefined time interval, and putting the protocol packets into the port transmit buffer if the port transmit buffer is not full and count of a packet counter in the packet buffer queue is larger than zero; and reading a protocol packet from the port transmit buffer and transmitting the protocol packet.

In comparison with the prior art, the invention has the following advantages:

Firstly, the invention provides an Ethernet protocol translation gateway, which can access the novel network and obtain the MAC address of the Ethernet protocol translation gateway and the terminal MAC address bond to the Ethernet protocol translation gateway from a node server on the novel network. Therefore, for a data packet sent from the novel network to the Ethernet, by adding the MAC address of the Ethernet protocol translation gateway and the MAC address of the target terminal into the data packet, it may be forwarded to the target terminal on the Ethernet according to the terminal MAC address; similarly, for a data packet sent from the Ethernet to the novel network, by removing the MAC address of the Ethernet protocol translation gateway and the MAC address of the target terminal from the data packet, it may be forwarded to the novel network according to the destination address (DA) of the novel network in the data packet. Thus, the convergence of the novel network and the Ethernet may be realized.

Secondly, in the invention, data transmission is implemented on the novel network and the Ethernet protocol translation gateway by looking up in an address table. A protocol packet address table, a reply packet address look-up table, a unicast data packet address table and a multicast data packet address table, which are respectively used for orienting the transmission of a protocol packet (including a query packet), a reply packet, a unicast data packet and a multicast data packet, are configured on the node server of the novel network, the access switch and the Ethernet protocol translation gateway, respectively.

Thirdly, accurate flow control may also be carried out on the Ethernet protocol translation gateway. For each service, the node server generates flow control information (sending time interval and sending data size) and sends it to an uplink Ethernet protocol translation gateway; the Ethernet protocol translation gateway generates a sending token according to the flow control information, and performs flow control on an uplink data packet. The Ethernet protocol translation gateway can convert a nonuniform data flow that is input, into a uniform data flow for sending.

DETAILED DESCRIPTION OF THE EMBODIMENTS

Figures 1, 2, 3:
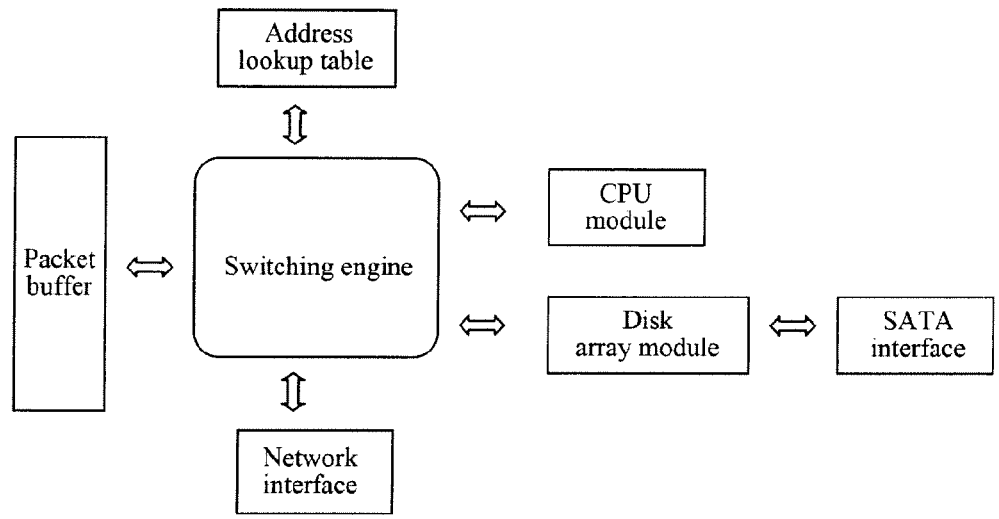
FIG. 1 is a data structural schematic diagram of a novel network according to an embodiment of the invention.
FIG. 2 is a data structural schematic diagram of an Ethernet according to an embodiment of the invention.
FIG. 3 is an internal structural schematic diagram of a node server in the novel network according to an embodiment of the invention.

To make the above objects, characteristics and advantages of the invention more apparent, the invention will be further illustrated below in detail in conjunction with the drawings and embodiments.

Firstly, the novel network put forward in the invention will be introduced in detail. The novel network has a network structure that is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

In order to realize the convergence of the above novel network and the existing Ethernet and make full use of the functions of the existing Ethernet protocol translation gateway at the same time, in the invention, the standard Ethernet gateway is reconstructed as a special-type access switch, which plays the role of connection and conversion between the novel network and the Ethernet. The reconstructed Ethernet gateway is referred to as Ethernet protocol translation gateway. In the novel network, the Ethernet protocol translation gateway lies on the access network part, and it may be connected with the access switch, or it may be directly connected with the node server. In the Ethernet, an Ethernet protocol translation gateway is connected with an Ethernet switch (L2 switch, for short below), and the Ethernet switch is connected with a terminal.

In the invention, the data transmission between the novel network and the Ethernet mainly relates to the following 4 data types:

1) Query Packet: a protocol packet sent from a node server to an access switch, an Ethernet protocol translation gateway or a terminal;

2) Reply Packet: a protocol packet replied by an access switch, an Ethernet protocol translation gateway or a terminal to a node server;

3) Unicast Data packet; and

4) Multicast Data packet.

The Ethernet protocol translation gateway mainly carries out the forwarding of the above 4 types of data between the novel network and the Ethernet, and the core implementation concept is as follows:

The Ethernet protocol translation gateway accesses the novel network, and it obtains the MAC address of the Ethernet protocol translation gateway and the terminal MAC address registered under the Ethernet protocol translation gateway from the node server that has centralized control function. When the Ethernet protocol translation gateway receives a data packet or a protocol packet sent from the novel network, it adds the MAC address of the Ethernet protocol translation gateway and the MAC address of the target terminal into the data packet or the protocol packet and then sends it to the Ethernet, and data packet or the protocol packet is transmitted in the Ethernet via Ethernet protocol; when the Ethernet protocol translation gateway receives the data packet or the protocol packet sent from the Ethernet, it removes the MAC address of the Ethernet protocol translation gateway and the MAC address of the source terminal in the data packet or the protocol packet and then sends it to the novel network, and the data packet or the protocol packet is transmitted in the novel network via the novel network protocol.

Wherein, the target terminal and the source terminal conform to the novel network protocol. Thus, the target terminal and the source terminal not only can enter the Ethernet via the MAC address, but only can enter the novel network by conforming to the novel network protocol. Therefore, compatible transmission can be realized on two different types of networks.

In the novel network, a data structure conforming to the novel network protocol is defined. Referring to FIG. 1, which is a data structural schematic diagram of the novel network, the novel network mainly includes: destination address (DA), source address (SA), reserved byte, payload and cyclic redundancy code (CRC). Wherein both the destination address (DA) and the source address (SA) are addresses in the novel network; the payload part is the content transmitted specifically and can be a command, a relay or data; and the CRC is cyclic redundancy code and its computing method conforms to standard Ethernet algorithms. The above 4 data types (data packet or protocol packet) all conform to such a data structure.

It the target terminal and the source terminal want to conform to the novel network protocol, they must conform to the above data structures of the novel network. Therefore, for a data packet or protocol packet sent from the novel network to the target terminal and a data packet or protocol packet sent from the source terminal in the Ethernet to the novel network, the packet headers both contain the addresses of the two transmission ends in the novel network, wherein the address is the source address (SA) and destination address (DA) of the packet or protocol packet. That is, a packet or protocol packet sent from the novel network to the target terminal has the address of the novel network, the data structure is as shown in FIG. 1, and the DA and SA of the packet header are both novel network addresses. When passing through an Ethernet protocol translation gateway, an Ethernet protocol translation gateway MAC (i.e., MAC SA) and a target terminal MAC (i.e., MAC DA) will be added to the packet header, then it enters the Ethernet, and it is transmitted to the target terminal according to Ethernet protocol; the packet or protocol packet sent from the source terminal in the Ethernet to the novel network has an address of the novel network and an MAC address of the Ethernet at the same time, and the data structure is as shown in FIG. 2, that is, the packet header not only contains an DA and SA of the novel network, but also contains an Ethernet protocol translation gateway MAC (i.e., MAC DA) and a source terminal MAC (i.e., MAC SA). When passing through an Ethernet protocol translation gateway, the Ethernet protocol translation gateway MAC and the source terminal MAC are removed from the packet header, then the packet enters the novel network, and it is transmitted according to novel network protocol.

During the above process in which the novel network and the Ethernet are made compatible with each other, terminals connected under L2 switch also establish a binding relation with an Ethernet protocol translation gateway, wherein said binding represents that a one-to-many mapping relation exists between the MAC address of the Ethernet protocol translation gateway and the MAC addresses of the terminals, that is, a plurality of terminals may be registered under one Ethernet protocol translation gateway. Such mapping and binding between terminal MAC address and Ethernet protocol translation gateway MAC address are preset in a node server of the novel network at the time the terminal and the Ethernet protocol translation gateway are sold, and the Ethernet protocol translation gateway is informed of the mapping and binding by the node server. If the terminal is moved to another place, it must be re-registered by the operator. Thus, Ethernet MAC addresses may be flexibly allocated to an Ethernet protocol translation gateway and a terminal bond thereto that are to be sold, thereby MAC address resources may be fully utilized. However, the MAC address of the Ethernet protocol translation gateway may be solidified in each Ethernet protocol translation gateway, and the MAC address of the terminal may also be solidified in each terminal. In such as case, it cannot flexibly allocate the MAC addresses.

Moreover, it can be known from the above that, the Ethernet protocol translation gateway and the terminal both have an address of the novel network and an MAC address of the Ethernet. Moreover, the address of the novel network and the MAC address of the Ethernet have a one-to-one mapping relation. Such a mapping relation may also be maintained by a node server of the novel network, and the Ethernet protocol translation gateway may be informed of mapping relation. Thus, when an Ethernet protocol translation gateway receives a packet or a protocol packet sent from the novel network, it may look up a target terminal MAC address corresponding to the novel network destination address (DA) in the packet according to such a mapping relation, and add it to the packet.

It has been briefly described above how the novel network and the Ethernet are made compatible with each other. The whole process will be described in detail below via the network access process and service process of a novel network node server and an Ethernet protocol translation gateway, and of a node server and a terminal, according to specific examples.

1. Novel Network Device and Data Structure 1.1 The Classification of the Novel Network Device 1.1.1 Device in the novel network system of the invention may be mainly divided into 3 categories: a server, a switch (including an Ethernet gateway) and a terminal (including various set-top boxes, code plates and storages, etc.). Generally, the novel network may be divided into a metropolitan area network (or state network and global network, etc.) and an access network.

1.1.2 Devices on the access network part may be mainly divided into 3 categories: a node server, an access switch, an Ethernet protocol translation gateway and a terminal (including various set-top boxes, code plates and storages, etc.). Wherein the node server is a node with a centralized control function in the access network, and can control the access switch and the terminal. The node server can be connected with the access switch directly and can also be connected with the terminal directly.

The specific hardware structure of each access network device is as follows:

(1) Node Server:

As shown in FIG. 3, a node server mainly includes a network interface module, a switching engine module, a CPU module and a disk array module;

Wherein, packets coming from the network interface module, the CPU module and the disk array module all enter the switching engine module; the switching engine module performs an operation of checking the address table on the packets, so that the orientation information of the packets is obtained; the packets are stored in a queue of the corresponding packet buffer according to the orientation information of the packets; if the queue of the packet buffer is to be full, the packets are discarded; the switching engine module polls all the packet buffer queues, and forwards the queue if the following conditions are met: 1) the port sending buffer is not full; 2) the count of the packet counter in the queue is greater than 0. The disk array module mainly realize the control on a hard disk, including operations of initialization, read and write, etc. on the hard disk; the CPU module is mainly responsible for the protocol processing with the access switch and the terminal (not shown), the configuring of the address table (including downlink protocol packet address table, uplink protocol packet address table and packet address table), and the configuring of the disk array module.

(2) Access Switch:

The access switch includes the access switch which controls flow and the access switch which does not control flow, wherein the access switch which does not control flow mainly includes a network interface module, a switching engine module and a CPU module, and module processing process can refer to the above node server.

Figure 4:
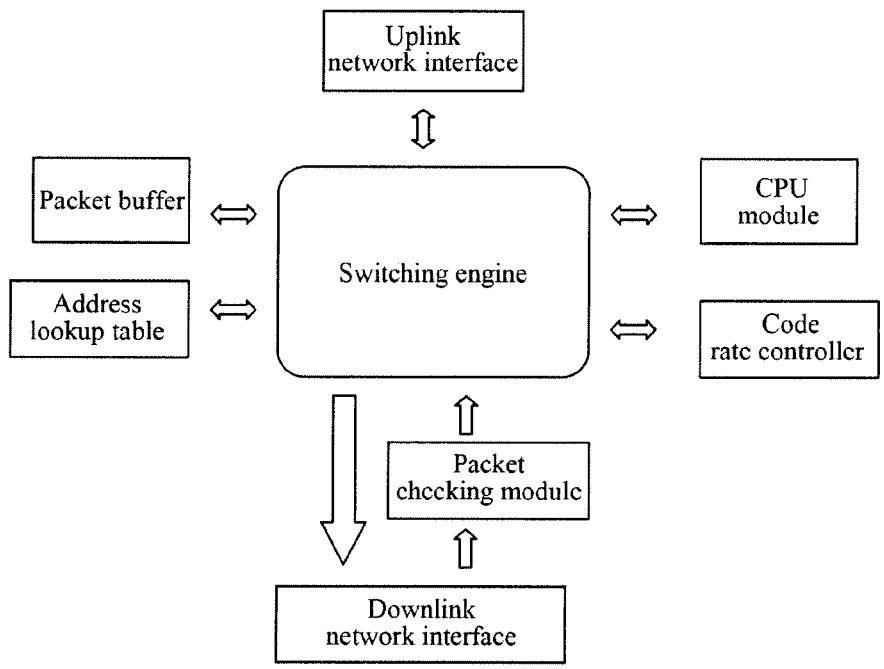
FIG. 4 is an internal structural schematic diagram of an access switch in the novel network according to an embodiment of the invention.

The structure of the access switch which controls flow is as follows:

As shown in FIG. 4, the access switch mainly includes network interface modules (a downlink network interface module and an uplink network interface module), a switching engine module and a CPU module;

Wherein, packets coming from the downlink network interface module (uplink data) enters the packet checking module; the packet checking module checks whether the destination address (DA), source address (SA), packet type and packet length of the packets meet a requirement, if so, it allocates a corresponding stream identifier (stream-id), and puts it into the switching engine module; otherwise, the packets are discarded. The packets coming from the uplink network interface module (downlink data) enter the switching engine module; the packets coming from the CPU module enter the switching engine module; the switching engine module performs an operate of checking the address table on the packets, so that the orientation information of the packets is obtained; if the packets entering the switching engine module go from a downlink network interface to an uplink network interface, the packets are stored in a queue of the corresponding packet buffer in conjunction with the stream identifier (stream-id); if the queue of the packet buffer is to be full, the packets are discarded; if the packets entering the switching engine module do not go from a downlink network interface to an uplink network interface, the packets are stored in a queue of the corresponding packet buffer according to the orientation information of the packets; if the queue of the packet buffer is to be full, the packets are discarded.

The switching engine module polls all the packet buffer queues, and it is divided into two cases in the embodiments of the invention:

if the queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port sending buffer is not full; 2) the count of the packet counter in the queue is greater than 0.

The code rate control module is configured by the CPU module, and a token is generated for all packet buffer queues that go from a downlink network interface to an uplink network interface in a programmable interval, for controlling the code rate of uplink forwarding.

The CPU module is mainly responsible for the protocol processing with the node server, the configuring of the address table and the configuring of the code rate control module.

Figure 5:
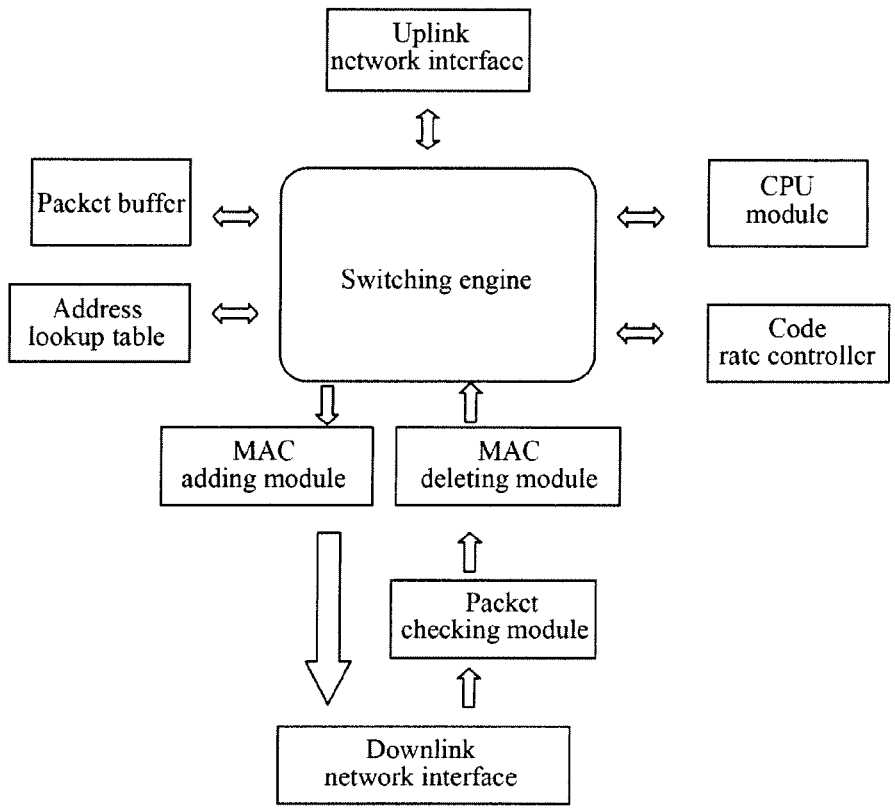
FIG. 5 is an internal structural schematic diagram of an Ethernet protocol translation gateway according to an embodiment of the invention.

(3) Ethernet Protocol Translation Gateway:

As shown in FIG. 5, the Ethernet protocol translation gateway mainly includes network interface modules (a downlink network interface module and an uplink network interface module), a switching engine module, a CPU module, a packet checking module, a code rate control module, a packet buffer and an MAC adding module and an MAC deleting module.

Wherein the data packets coming from the downlink network interface module enter the packet checking module; the packet checking module checks whether the Ethernet MAC DA, Ethernet MAC SA, Ethernet length or frame type, novel network destination address DA, novel network source address SA, novel network packet type and packet length of the data packets meet a requirement, if so, a corresponding stream identifier (stream-id) will be allocated; then, the MAC deleting module removes the MAC DA, the MAC SA and the length or frame type (2 byte), and puts it into a corresponding receive buffer; otherwise, it will be discarded;

The downlink network interface module checks the sending buffer of the port, if there exists a packet, it acquires the Ethernet MAC DA of the corresponding terminal according to the novel network destination address DA of the packet, adds the Ethernet MAC DA of the terminal, the MAC SA of the Ethernet protocol translation gateway and the Ethernet length or frame type, and sends it out.

The function of other modules in the Ethernet protocol translation gateway is similar to that of the access switch.

(4) Terminal:

The terminal mainly comprises a network interface module, a service processing module and a CPU module; for example, a set-top box mainly comprises a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.1.3 The device on the metropolitan area network part may be mainly divided into 2 categories: a node server, a node switch and a metropolitan area server.

Wherein, the node switch mainly includes a network interface module, a switching engine module and a CPU module; the metropolitan area server mainly comprises a network interface module, a switching engine module and a CPU module. The node server is the node server of the access network part, and also belongs to the metropolitan area network part. The metropolitan area server is a node with a centralized control function in the metropolitan area network, and can control the node switch and the node server. The metropolitan area server can be connected with the node switch directly and can be also connected with the node server directly.

1.2 The Definition of Novel Network Data Packet

As shown in FIG. 1, The novel network data packet mainly includes the following parts: destination address (DA), source address (SA), reserved byte, payload (PDU) and CRC. Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Source address (SA) is also consisted of 8 bytes, the definition of which is the same as that of destination address (DA);

Reserved Byte is Consisted of 2 Bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases; and CRC is consisted of 4 bytes, and the calculation method thereof conforms to standard Ethernet CRC algorithm.

The above destination address (DA) and source address (SA) are the destination address (DA) and source address (SA) of the novel network.

1.3 The Definition of Ethernet Data Packet

As shown in FIG. 2, the Ethernet data packet mainly includes the following parts: Ethernet destination address (MAC DA), Ethernet source address (MAC SA), length or frame type, novel network destination address (DA), novel network source address (SA), reserved byte, payload (PDU) and CRC. Wherein:

Ethernet destination address (MAC DA) is consisted of 6 bytes;

Ethernet source address (MAC SA) is consisted of 6 bytes;

Length or frame type is consisted of 2 bytes and can be user-defined;

Novel network destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Novel network source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases; and CRC is consisted of 4 bytes, and the calculation method thereof conforms to standard Ethernet CRC algorithm.

1.4 Novel Network Implementation

In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet.

Moreover, in the access network, for the above four types of data packets, the following four address lookup tables are set in the node server and the node switch for performing transfer orientation of the data packet or the protocol packet according to the corresponding address lookup table after receiving various types of data packets or protocol packets. Accordingly, the address lookup tables includes:

1) a address table of protocol packet: also referred to as a address table of downlink protocol packet, and used for transfer orientation of the query packet or the service request protocol packet;

2) a address table of reply packet: also referred to as a address table of uplink protocol packet, and used for transfer orientation of the reply packet;

3) a address table of unicast data packet: used for transfer orientation of the unicast data packet; and 4) a address table of multicast data packet: used for transfer orientation of the multicast data packet.

For example, a access network address is consisted of 16 bits, so the total number of access switches and terminals that can be accessed will be 65536. It is hypothesized that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100 M network interface, 8 downlink 100 M network interfaces and 1 CPU module interface. If the 8 downlink 100 M network interfaces are in turn defined as port 0 to port 7, the CPU module interface is defined as port 8, and the uplink 100 M network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x1500 0x0000 0x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

Figure 6:
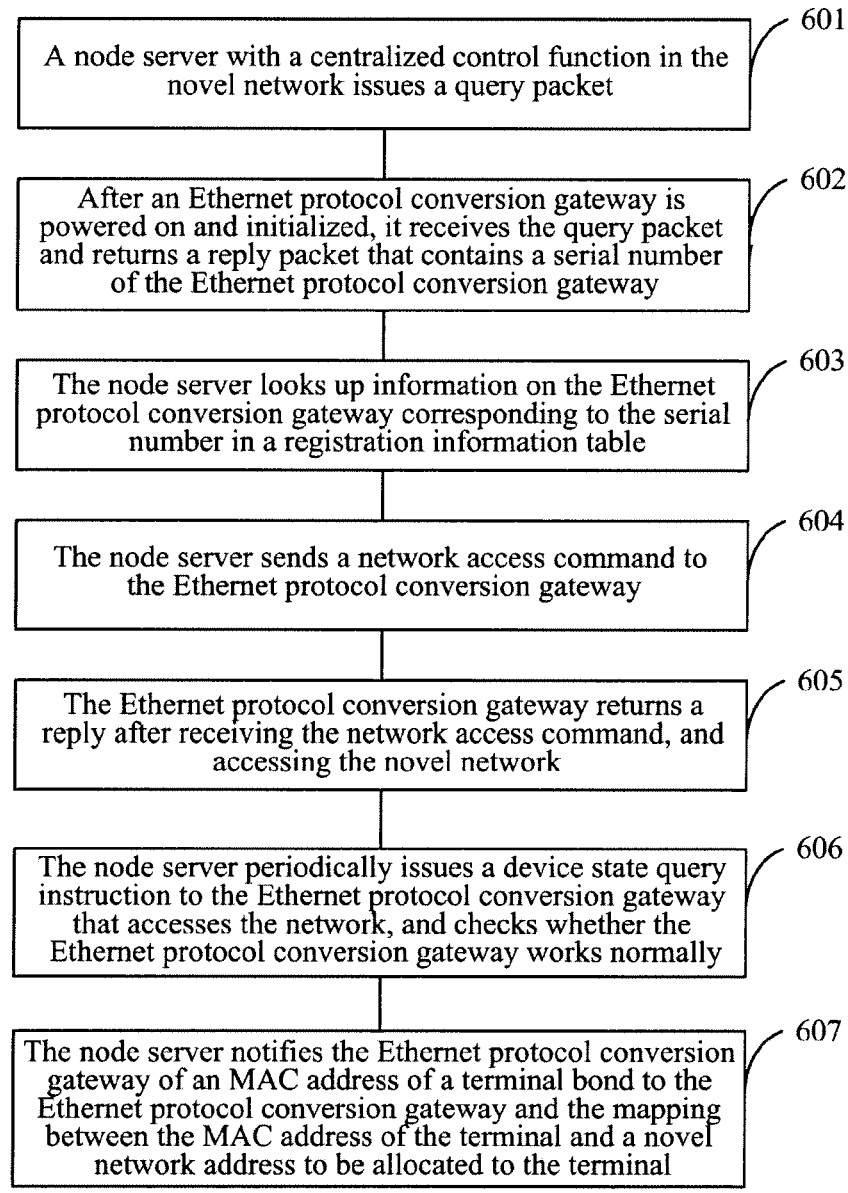
FIG. 6 is a flow chart showing the process in which an Ethernet protocol translation gateway accesses a novel network according to an embodiment of the invention.

2. The Network Access Process of a Node Server and an Ethernet Protocol Translation Gateway is as Follows:

Referring to FIG. 6, it is a flow chart showing the process in which an Ethernet protocol translation gateway accesses a novel network according to an embodiment of the invention.

Firstly, each Ethernet protocol translation gateway that is allowed to access the network registers on the node server, and the registration information of the Ethernet protocol translation gateway contains intrinsic information such as the serial number of the Ethernet protocol translation gateway (including device type and device identification information), number of downlink ports and mask zone, etc. An Ethernet protocol translation gateway that is not registered will be unable to access the network.

Step 601: A node server with a centralized control function in the novel network issues a query packet;

The node server sends the query packet to each port.

Step 602: After the Ethernet protocol translation gateway is powered on and initialized, it receives the query packet and returns a reply packet that contains a serial number of the Ethernet protocol translation gateway;

It is hypothesized that the Ethernet protocol translation gateway receives a query packet issued by a certain port (for example, port 0).

Step 603: The node server looks up the Ethernet protocol translation gateway information corresponding to the serial number in the registration information table, wherein the Ethernet protocol translation gateway information includes Ethernet protocol translation gateway MAC address and terminal MAC address bond to the Ethernet protocol translation gateway;

After node server receives the reply packet issued by the Ethernet protocol translation gateway, it will know that port 0 is connected with an Ethernet protocol translation gateway, then it looks up in an internal registration information table.

Step 604: The node server sends a network access command to the Ethernet protocol translation gateway, wherein the network access command contains the address of the Ethernet protocol translation gateway in the novel network and the MAC address of the Ethernet protocol translation gateway;

That is, the node server notifies the Ethernet protocol translation gateway of the novel network address of the Ethernet protocol translation gateway and the Ethernet MAC address registered in advance, via a network access command.

Step 605: The Ethernet protocol translation gateway returns a reply after receiving the network access command, and accessing the novel network;

After receiving the network access command, the Ethernet protocol translation gateway will know the address of the novel network accessed and the MAC address of the Ethernet.

Step 606: The node server periodically issues a device state query instruction to the Ethernet protocol translation gateway that accesses the network, and checks whether the Ethernet protocol translation gateway works normally;

After the node server receives a network access command reply, it will know that the Ethernet protocol translation gateway has accessed the network, and then it periodically (for example, each second) sends a device state query instruction to port 0. If the node server does not receive a state query reply in a certain period of time (for example, 6 seconds), it will be considered that the Ethernet protocol translation gateway has been removed from the network, and no device state query instruction will be sent any longer. It continues to send a query packet to port 0.

Step 607: The node server notifies the Ethernet protocol translation gateway of the terminal MAC address bond to the Ethernet protocol translation gateway, and the mapping between the terminal MAC address and the novel network address to be allocated to the terminal.

The node server knows according to the registration information table that a terminal is bond to the Ethernet protocol translation gateway, so it sends the terminal MAC address bond to the Ethernet protocol translation gateway, and the mapping between the terminal MAC address and the novel network address to be allocated, to the Ethernet protocol translation gateway.

Via the above network access process, the Ethernet protocol translation gateway will know its own novel network address, Ethernet MAC address, the terminal MAC address bond thereto and the mapping between the terminal MAC address and the novel network address to be allocated to the terminal.

Preferably, based on the above process, data transmission on the novel network may be specifically realized by looking up in an address table. Each node on the novel network, including node server, access switch and Ethernet protocol translation gateway, maintains its own address table, and each time data are received, it performs data transmission and orientation according to the address table. Because the data transmission between the novel network and the Ethernet mainly relates to the transmission of a query packet, a reply packet, a unicast data packet and a multicast data packet, the address table is also divided into:

1) protocol packet address table: table 0 for short below, for transmitting and orienting a query packet or a service request protocol packet;

2) reply packet address look-up table: table 1 for short below, for transmitting and orienting a reply packet;

3) unicast data packet address table: table 2 for short below, for transmitting and orienting a unicast data packet; and 4) multicast data packet address table: table 3 for short below, for transmitting and orienting a multicast data packet.

In conjunction with the above network access process of an Ethernet protocol translation gateway, during the powering and initializing process of the Ethernet protocol translation gateway at step 302, table 0, table 1, table 2 and table 3 will be initialized. Then, after the Ethernet protocol translation gateway receives the network access command at step 305, it will configure table 0: orienting the query packet or service request protocol packet sent to local machine to the CPU module port of the local machine. Then, after the Ethernet protocol translation gateway sends a reply and accesses the network, the node server will further sends a configuration instruction to the Ethernet protocol translation gateway for configuring table 0 on the Ethernet protocol translation gateway: orienting the query packet or service request protocol packet sent to the terminal bond to the Ethernet protocol translation gateway to a corresponding port of the Ethernet protocol translation gateway respectively.

3. The Network Access Process of a Node Server and a Terminal is as Follows:

After the Ethernet protocol translation gateway accesses the novel network, a terminal bond thereto also accesses the novel network.

Figure 7:
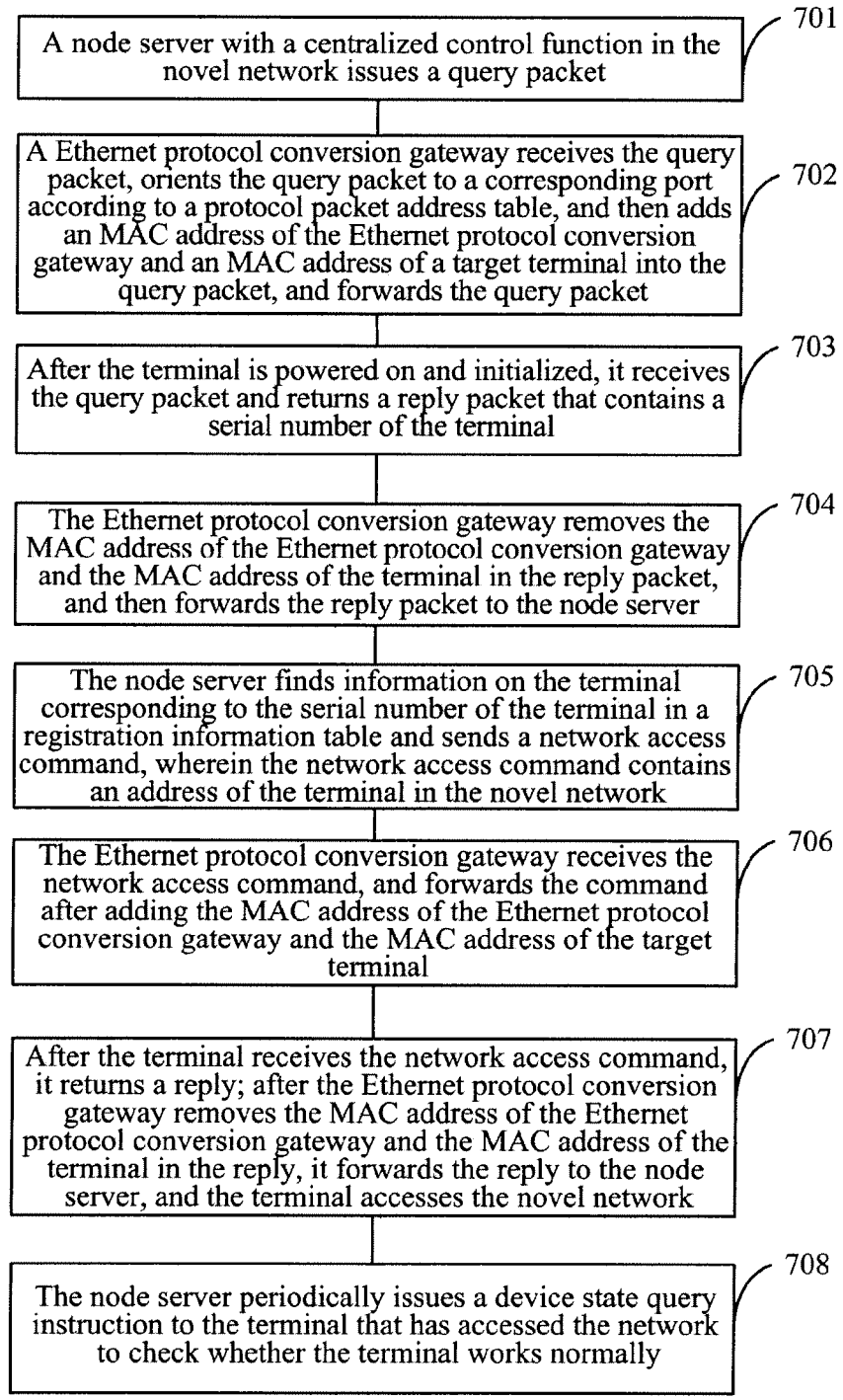
FIG. 7 is a flow chart showing the process in which a terminal accesses a novel network according to an embodiment of the invention.

Referring to FIG. 7, it is a flow chart showing the process in which a terminal accesses a novel network according to an embodiment of the invention.

Similarly, each terminal that is allowed to access the network is registered on the node server, and it is registered under the Ethernet protocol translation gateway to which it is bond, wherein the registration information of a terminal contains terminal serial number (including device type and device identification information) and intrinsic information. A terminal that is not registered will be unable to access the network.

Step 701: A node server with a centralized control function in the novel network issues a query packet;

After an Ethernet protocol translation gateway accesses the network, the node server will send a query packet to a downlink port of the Ethernet protocol translation gateway to check whether a terminal device is connected under the Ethernet protocol translation gateway.

Step 702: The Ethernet protocol translation gateway receives the query packet, orients the query packet to a corresponding port according to a protocol packet address table, and then adds the MAC address of the Ethernet protocol translation gateway and the MAC address of the target terminal into the query packet, and forwards the query packet.

The destination address (DA) of the query packet is the novel network address to be allocated by the node server to the terminal. Therefore, after the Ethernet protocol translation gateway receives the query packet, it may look up the corresponding terminal MAC address according to the mapping between the novel network address and the Ethernet MAC address, and then adds it to the packet and sends the packet. After the query packet enters the Ethernet, it is transmitted according to the Ethernet protocol, and finally it is delivered to the target terminal.

Step 703: After the terminal is powered on and initialized, it receives the query packet and returns a reply packet that contains the terminal serial number.

Step 704: The Ethernet protocol translation gateway removes the Ethernet protocol translation gateway MAC address and the terminal MAC address in the reply packet, and then forwards the reply packet to the node server;

The reply packet contains the Ethernet protocol translation gateway MAC address, the terminal MAC address, the destination address (DA) and source address (SA) of the novel network. After the Ethernet protocol translation gateway removes the Ethernet protocol translation gateway MAC address and the terminal MAC address, it orients the packet by looking up in table 1. The reply packet enters the novel network, and it is transmitted according to the novel network protocol.

Step 705: The node server finds the terminal information corresponding to the terminal serial number in a registration information table and sends a network access command, wherein the network access command contains the terminal address in the novel network;

After the node server receives the reply packet issued by the terminal, it will know that a terminal device is connected with the Ethernet protocol translation gateway, and then it looks up in an internal registration information table.

Step 706: The Ethernet protocol translation gateway receives the network access command, and forwards the command after adding the MAC address of the Ethernet protocol translation gateway and the MAC address of the target terminal;

Step 707: After the terminal receives the network access command, it returns a reply; after the Ethernet protocol translation gateway removes the Ethernet protocol translation gateway MAC address and the terminal MAC address in the reply, it forwards the reply to the node server, and the terminal accesses the novel network;

After the terminal receives the network access command, it will know the address of the novel network accessed.

Step 708: The node server periodically issues a device state query instruction to the terminal that has accessed the network to check whether the terminal works normally.

After the node server receives a network access command reply, it knows that the terminal bond to the Ethernet protocol translation gateway has accessed the network, and then it periodically (for example, each second) sends a device state query instruction to the terminal. If the node server does not receive a state query reply in a certain period of time (for example, 6 seconds), it will be considered that the terminal has been removed from the network, and no device state query instruction will be sent any longer; instead, it continues to send a query packet to the current port.

In the above process, data transmission inside the Ethernet conforms to an Ethernet protocol. In the Ethernet protocol, L2 switch can directly send a packet to a destination node, rather than sending a packet to all the nodes in broadcast mode just like a hub; the most crucial technology thereof is that the switch may identify the network card MAC address of a node connected to the network and put it into a place named MAC address table. The MAC address table is stored in a buffer of the switch, and the address is remembered. Thus, when it needs to send data to the destination address, the switch may look up the node location of the MAC address in the MAC address table, and then it sends the data to said location directly. So-called number of MAC addresses represents the maximum number of MAC addresses that may be stored in the MAC address table of the switch. The more MAC addresses are stored, the higher the data forwarding speed and efficiency will be. Sufficient buffers are needed on each port of the switch to memorize these MAC addresses. Therefore, the number of MAC addresses that can be memorized by an switch will be determined by the size of the Buffer capacity correspondingly. Generally, it will be enough for an switch to memorize 1024 MAC addresses. 1024 MAC addresses may be memorized on an office end. On a terminal, 16 MAC addresses are supported due to a FLASH problem and actual demand.

In the Ethernet protocol, an MAC address is needed when information is transmitted between the hosts on one and the same subnet; but when information is sent for the first time, there exists only an IP address, without MAC address. At this point, a packet will be sent, wherein the IP address is the IP address of the target machine, and the MAC address is ff-ff-ff-ff-ff-ff, which represents broadcast, that is, all machines on the subnet can receive the packet; after other hosts receive the packet, if they find that the IP address is not the IP address of their own, the packet will be discarded; and if the IP address is that of its own, it sends a packet to the source machine, which contains its MAC address. After the source machine receives the packet, it will know the MAC address of the target machine, which is called MAC address self-learning.

MAC address self-learning on an switch represents that: a correspondence table between an MAC address and each interface of the switch (for example, four interfaces for a household switch) exists on the switch, each time a packet is forwarded via the switch, it will be forwarded to all ports if no correspondence relation of the MAC address exists in the correspondence table; when the target machine returns information from a certain port, it will know to which port this MAC address corresponds, then this correspondence relation will be added into the table, which is MAC address self-learning of the switch.

4. An Example of Interaction Between a Node Server and an Ethernet Protocol Translation Gateway, Terminal During a Network Access Process 4.1 Interaction Example 1

It will be illustrated by a specific example, based on the above network access process of an Ethernet protocol translation gateway and a terminal.

Figure 8:
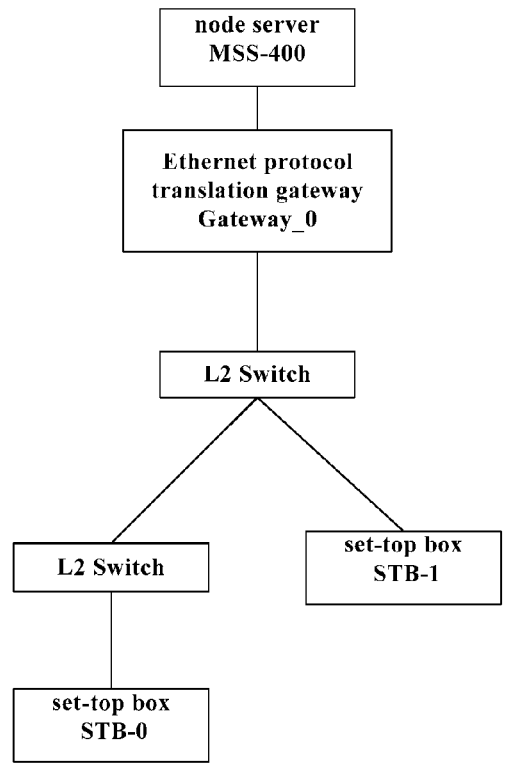
FIG. 8 is an exemplary connection diagram showing the interaction among a node server, an Ethernet protocol translation gateway and a terminal during a network access process according to an embodiment of the invention.

For convenient discussion, the Ethernet protocol translation gateway may be connected with an access switch or connected with a node server directly; referring to FIG. 8, it is hypothesized that port 1 of Ethernet protocol translation gateway gateway_0 is directly connected with port 0 of node server MSS-400, and port 0 of Ethernet protocol translation gateway gateway_0 is connected with a group of L2 switches, and four terminals are registered under this Ethernet protocol translation gateway, but only two terminals, STB_0 and STB_1, are connected under the L2 switches.

The MAC address of gateway_0 is 0x0005 0x5dfd 0x3ebf, and the MAC addresses of four novel network terminals registered under gateway_0 are 0x0005 0x5dfd 0x0000, 0x0005 0x5dfd 0x0001, 0x0005 0x5dfd 0x0002 and 0x0005 0x5dfd 0x0003 respectively, and STB_0 and STB_1 are the first two terminals thereof.

1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of an switch and the registration information of a terminal, etc.), and server MSS-400 configures its own access network address as 0x0000;

2) Server MSS-400 initializes tables 0, 1, 2 and 3:
configuring table 0 as "000 0000 0000", i.e., all query packet transmission is closed;
configuring table 1 as "001 0000 0000", i.e., all reply packets are to be oriented to the CPU;
configuring tables 2 and 3 as "000 0000 0000", i.e., all unicast or multicast data packet transmission is closed;

3) Server MSS-400 knows that it has 8 downlink ports, so it configures the 8 items of table 0 respectively as:
"00 0000 0000 0000 0001"=>"000 0000 0001", i.e., a query packet with a destination address (DA) of 0x8000 0x0000 0x0000 0x0001 is oriented to port 0;
"00 0000 0000 0000 0010"=>"000 0000 0010", i.e., a query packet with a destination address (DA) of 0x8000 0x0000 0x0000 0x0002 is oriented to port 1;
"00 0000 0000 0000 0011"=>"000 0000 0100", i.e., a query packet with a destination address (DA) of 0x8000 0x0000 0x0000 0x0003 is oriented to port 2;
"00 0000 0000 0000 0100"=>"000 0000 1000", i.e., a query packet with a destination address (DA) of 0x8000 0x0000 0x0000 0x0004 is oriented to port 3;
"00 0000 0000 0000 0101"=>"000 0001 0000", i.e., a query packet with a destination address (DA) of 0x8000 0x0000 0x0000 0x0005 is oriented to port 4;
"00 0000 0000 0000 0110"=>"000 0010 0000", i.e., a query packet with a destination address (DA) of 0x8000 0x0000 0x0000 0x0006 is oriented to port 5;
"00 0000 0000 0000 0111"=>"000 0100 0000", i.e., a query packet with a destination address (DA) of 0x8000 0x0000 0x0000 0x0007 is oriented to port 6;
"00 0000 0000 0000 1000"=>"000 1000 0000", i.e., a query packet with a destination address (DA) of 0x8000 0x0000 0x0000 0x0008 is oriented to port 7;

4) Server MSS-400 sends port query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 00000 0x0000 0x0000 0x0000), and according to the configuration of table 0, the port query packet will be in turn oriented to ports 0 to 7;

5) After Ethernet protocol translation gateway gateway_0 is powered on, it initializes the hardware:
configuring table 0 "00 xxxx xxxx xxxx xxxx" as "100", i.e., all query packets are oriented to the CPU;
configuring table 1 "01 xxxx xxxx xxxx xxxx" as "010", i.e., all reply packets are oriented to uplink 100 M network interface;
configuring table 2 and table 3 as "000", i.e., all unicast or multicast data packet transmission is closed;

6) After Ethernet protocol translation gateway gateway_0 receives the port query packet, it sends a reply (the reply contains the device type and device identification of the current switch, which is the intrinsic information of each switch), wherein DA of the packet is 0x0800 0x0000 0x0000 0x0000, and SA is 0x0000 0x0000 0x0000 0x0001;

7) After server MSS-400 receives the reply issued by Ethernet protocol translation gateway gateway_0, it will know that port 0 is connected with an Ethernet protocol translation gateway by contrasting the source address (SA) of the reply packet to the device type, then the Ethernet protocol translation gateway information is found in the internal registration information table of the server, which includes Ethernet MAC address of gateway_0 and Ethernet MAC address of a novel network terminal registered under gateway_0, then a network access command is sent to the access switch (which informs that the access network address of gateway_0 is 0x0001, and the MAC address of gateway_0 is 0x0005 0x5dfd 0x3ebf);

8) After Ethernet protocol translation gateway gateway_0 receives the network access command, it knows that its own access network address is 0x0001 and MAC address is 0x0005 0x5dfd 0x3ebf, and it accesses the network, and then it configures table 0 "00 0000 0000 0000 0001" as "100", and the remaining items of table 0 are configured as "000", i.e., only the query packet of the current switch is imported to the CPU, and the rest query packets are discarded; at the same time, a network access command reply is sent to the server;

9) After server MSS-400 receives the network access command reply issued by Ethernet protocol translation gateway gateway_0, it will know that Ethernet protocol translation gateway gateway_0 has accessed the network, and then a device state query instruction is sent to the port each second to check whether Ethernet protocol translation gateway gateway_0 works normally, and at the same, a port query packet is sent to a downlink port of Ethernet protocol translation gateway gateway_0 to check whether a terminal device is connected under Ethernet protocol translation gateway gateway_0; because server MSS-400 knows that four novel network terminals are registered under Ethernet protocol translation gateway gateway_0, the following configurations will be performed by server MSS-400:

"00 0000 0000 0000 1001"=>"000 0000 0001", i.e., a query packet with a destination address (DA) of 0x8000 0x0000 0x0000 0x0009 is oriented to port 0;
"00 0000 0000 0000 1010"=>"000 0000 0001", i.e., a query packet with a destination address (DA) of 0x8000 0x0000 0x0000 0x000a is oriented to port 0;
"00 0000 0000 0000 1011"=>"000 0000 0001", i.e., a query packet with a destination address (DA) of 0x8000 0x0000 0x0000 0x000b is oriented to port 0;
"00 0000 0000 0000 1100"=>"000 0000 0001", i.e., a query packet with a destination address (DA) of 0x8000 0x0000 0x0000 0x000c is oriented to port 0;

Server MSS-400 will notify gateway_0 to perform the following configurations:

"00 0000 0000 0000 1001"=>"001", i.e., a query packet with a destination address (DA) of 0x8000 0x0000 0x0000 0x0009 is oriented to port 0, wherein the corresponding MAC address thereof is 0x0005 0x5dfd 0x0000;
"00 0000 0000 0000 1010"=>"001", i.e., a query packet with a destination address (DA) of 0x8000 0x0000 0x0000 0x000a is oriented to port 0, wherein the corresponding MAC address thereof is 0x0005 0x5dfd 0x0001;
"00 0000 0000 0000 1011"=>"001", i.e., a query packet with a destination address (DA) of 0x8000 0x0000 0x0000 0x000b is oriented to port 0, wherein the corresponding MAC address thereof is 0x0005 0x5dfd 0x0002;
"00 0000 0000 0000 1100"=>"001", i.e., a query packet with a destination address (DA) of 0x8000 0x0000 0x0000 0x000c is oriented to port 0, wherein the corresponding MAC address thereof is 0x0005 0x5dfd 0x0003;

10) Server MSS-400 sends port query packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c (with an SA of 0x0000 0x0000 0x0000 0x0000), according to the configuration of table 0 on server MSS-400, the port query packets will be in turn oriented to port 0 of server MSS-400, and according to the configuration of table 0 on Ethernet protocol translation gateway gateway_0, the port query packets will be in turn oriented to port 0 of Ethernet protocol translation gateway gateway_0, and the sending module on port 0 of Ethernet protocol translation gateway gateway_0 knows the Ethernet MAC DA of the corresponding terminal (6 byte) according to the novel network destination address DA of the packet, and adds the Ethernet MAC DA of the terminal (6 byte), the MAC SA of the Ethernet protocol translation gateway (6 byte) and Ethernet length or frame type (2 byte), i.e., 0x0005 0x5dfd 0x0000 0x0005 0x5dfd 0x3ebf 0x0000 (user-defined) 0x8000 0x0000 0x0000 0x0009, 0x0005 0x5dfd 0x0001 0x0005 0x5dfd 0x3ebf 0x0000 (user-defined) 0x8000 0x0000 0x0000 0x000a, 0x0005 0x5dfd 0x0002 0x0005 0x5dfd 0x3ebf 0x0000 (user-defined) 0x8000 0x0000 0x0000 0x000b, 0x0005 0x5dfd 0x0003 0x0005 0x5dfd 0x3ebf 0x0000 (user-defined) 0x8000 0x0000 0x0000 0x000c, and sends the packets;

11) According to an appendix, the L2 switches in the local area network may know that the tables thereof do not contain the correspondence relation with these MAC addresses (i.e., 0x0005 0x5dfd 0x0000, 0x0005 0x5dfd 0x0001, 0x0005 0x5dfd 0x0002, 0x0005 0x5dfd 0x0003), then these packets will be forwarded to all the ports. STB_0 and STB_1 will both receive the four packets, and they compare the MAC DA of the packets to their own MAC address (burned in a flash of the terminal when leaving the factory); if they are the same, the packets will be received; otherwise, they will be discarded. After STB_0 receives the port query packet, it sends a reply (the reply contains the device type and device identification of the current terminal, which is the intrinsic information of each terminal), the header of the packet is 0x0005 0x5dfd 0x3ebf 0x0005 0x5dfd 0x0000 0x0000 (user-defined) 0x0800 0x0000 0x0000 0x0000 0x0000 0x0000 0x0000 0x000a; after STB_1 receives the port query packet, it sends a reply (the reply contains the device type and device identification of the current terminal, which is the intrinsic information of each terminal), the header of the packet is 0x0005 0x5dfd 0x3ebf 0x0005 0x5dfd 0x0001 0x0000 (user-defined) 0x0800 0x0000 0x0000 0x0000 0x0000 0x0000 00000 0x000b.

12) According to an appendix, the L2 switches in the local area network may know that the two packets will be oriented to port 0 of Ethernet protocol translation gateway gateway_0. After being checked by the packet checking module on port 0, totally 14 bytes are removed, i.e., MAC DA (6 byte), MAC SA (6 byte) and length or frame type (2 byte), then it enters the corresponding receive buffer, and the switching engine polls each receive buffer, if yes, it performs combined address field table lookup, so that the orientation information of the packet is obtained; and according to table 1 of gateway_0, the packet from which MAC is removed will be oriented to port 1;

13) After server MSS-400 receives the reply issued by STB_0 and STB_1, by contrasting the source address (SA) of the reply packet to the device type, it will know that two registered terminals are connected under gateway_0, then the terminal information is found in the internal registration information table of the server, and a network access command is sent to STB_0 and STB_1 (informing that the access network addresses of STB_0 and STB_1 are 0x000a and 0x000b); according to 10), gateway_0 adds an MAC to the reply and then orients it to port 0.

14) According to an appendix, the L2 switches in the local area network may know that the two packets will be respectively oriented to STB_0 and STB_1, rather than being broadcasted.

15) After receiving the network access command, STB_0 and STB_1 will know that their own access network addresses are 0x000a and 0x000b, they access the network and send a network access command reply to the server at the same time;

After server MSS-400 receives the network access command replies issued by STB_0 and STB_1, it will know that STB_0 and STB_1 have accessed the network, and then a device state query instruction is sent to the port each second to check whether STB_0 and STB_1 work normally. When the server does not receive a state query reply in 6 seconds, it will be considered that terminal has been removed from the network, and no device state query instruction will be sent any longer; instead, it continues to send a port query packet to the current port.

4.2 Interaction Example 2

During the network access process of a node server and an Ethernet protocol translation gateway, a terminal, the node server manages the network access address via an address information table it maintains. The management of the address information table will be illustrated below via another example.

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink flow count of each of its network ports, if the device is an access switch; the access network address of a device connected with its network port and the uplink, the count of its read and write channels and uplink and downlink flow count of its network port, if the device is a storage; and so on. All the information is used to provide a decision-making foundation to the service process, and the information will be modified during each service process.

Figure 9:
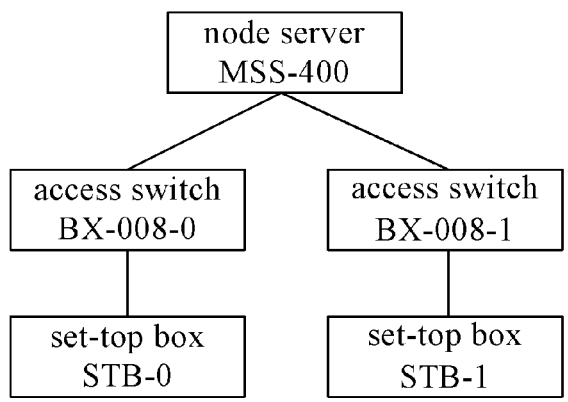
FIG. 9 is an exemplary connection diagram showing the interaction among a node server, an access switch and a terminal during a network access process according to an embodiment of the invention.

As shown in FIG. 9, It is hypothesized that there exists a node server MSS-400, port 0 thereof is connected with an access switch BX-008-0 (in fact, by adding an MAC adding and removing function of the invention to BX-008-0, it can be regarded as the Ethernet protocol translation gateway of the invention), port 1 thereof is connected with an access switch BX-008-1, and port 0 of BX-008-0 is connected with set-top box STB-0, port 1 of BX_008-1 is connected with set-top box STB-1.

1) After server MSS-400 is powered on, it initializes the hardware, obtains the default metropolitan area network address (which is hypothesized as 0x00 0x0000 0x0000), and imports a configuration file from the hard disk to the CPU memory (for example, the registration information of an switch and the registration information of a terminal, etc.), and server MSS-400 initializes the address information table and clears all items (which represents that no address is used), and server MSS-400 configures its own access network address as 0x0000, that is, item 0x0000 of the address information table is configured as follows:

address occupation descriptor: "10" represents that the address is used;

device descriptor: "000000" represents node server;

device resource description information: the node server has 8 downlink 100 M network interfaces in turn defined as port 0 to port 7, 1 CPU module interface defined as port 8, 1 disk array interface defined as port 9, 1 uplink 1000 M fiber interface defined as port 10, and the type of this node server is MSS-400, the access network address of a device connected with its network port is not allocated, and downlink flow count of each of its network ports is 0;

The next available address of the address information table is 0x0001;

2) Server MSS-400 initializes tables 0, 1, 2 and 3:

configuring table 0 as "000 0000 0000", i.e., the transmission of all downlink protocol packets is closed;

configuring table 1 as "001 0000 0000", i.e., all uplink protocol packets are oriented to the CPU;

configuring tables 2 and 3 as "000 0000 0000", i.e., all unicast or multicast data packet transmission is closed;

3) Server MSS-400 knows it has 8 downlink ports and the next available address is 0x0001, so it configures the 8 items of table 0 respectively as:

"00 0000 0000 0000 0001"=>"000 0000 0001", i.e., a query packet with a destination address (DA) of 0x8000 0x0000 0x0000 0x0001 is oriented to port 0;

"00 0000 0000 0000 0010"=>"000 0000 0010", i.e., a query packet with a destination address (DA) of 0x8000 0x0000 0x0000 0x0002 is oriented to port 1;

"00 0000 0000 0000 0011"=>"000 0000 0100", i.e., a query packet with a destination address (DA) of 0x8000 0x0000 0x0000 0x0003 is oriented to port 2;

"00 0000 0000 0000 0100"=>"000 0000 1000", i.e., a query packet with a destination address (DA) of 0x8000 0x0000 0x0000 0x0004 is oriented to port 3;

"00 0000 0000 0000 0101"=>"000 0001 0000", i.e., a query packet with a destination address (DA) of 0x8000 0x0000 0x0000 0x0005 is oriented to port 4;

"00 0000 0000 0000 0110"=>"000 0010 0000", i.e., a query packet with a destination address (DA) of 0x8000 0x0000 0x0000 0x0006 is oriented to port 5;

"00 0000 0000 0000 0111"=>"000 0100 0000", i.e., a query packet with a destination address (DA) of 0x8000 0x0000 0x0000 0x0007 is oriented to port 6;

"00 0000 0000 0000 1000"=>"000 1000 0000", i.e., a query packet with a destination address (DA) of 0x8000 0x0000 0x0000 0x0008 is oriented to port 7;

4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:

address occupation descriptor: "01" represents that the address is standby;

device descriptor: it will not be modified;

device resource description information: it will not be modified;

The next available address of the address information table is 0x0009;

5) After switches BX-008-0 and BX-008-1 are powered on, they initializes the hardware:
  configuring its table 0 "00 xxxx xxxx xxxx xxxx" as "01 0000 0000", i.e., all downlink protocol packets are oriented to the CPU;
  configuring its table 1 "01 xxxx xxxx xxxx xxxx" as "10 0000 0000", i.e., all uplink protocol packets are oriented to the uplink 100 M network interface;
  configuring its tables 2 and 3 as "00 0000 0000", i.e., all unicast or multicast data packet transmission is closed;

6) After switch BX-008-0 receives a query packet, it receives the query packet to its CPU module according to the configuration of its table 0, the CPU module resolves the query packet and generates a reply packet (which contains the registration information of the current access switch) and sends it to server MSS-400, wherein DA of the packet is 0x0800 0x0000 0x0000 0x0000, and SA is 0x0000 0x0000 0x0000 0x0001;

7) After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command reply is sent to the server;

9) After server MSS-400 receives the network access command reply issued by switch BX-008-0, it will know that switch BX-008-0 has accessed the network, then item 0x0001 of the internal address information table of the server is configured as:
  address occupation descriptor: "10" represents that the address is used;
  device descriptor: "000001" represents an access switch BX-008;
  device resource description information:
  the access switch has 8 downlink 100 M network interfaces defined in turn as port 0 to port 7, 1 CPU module interface defined as port 8 and 1 uplink 100 M network interface defined as port 9, the type of the access switch is BX-008, the access network address of the device connected with its uplink network port is 0x0000 (i.e., MSS-400), the access network address of the device connected with the downlink network port is not allocated, and downlink flow count of each of its network ports is 0;

Then, a device state query instruction is sent to the port each second to check whether switch BX-008-0 works normally; and at the same, a port downlink protocol packet is sent to the downlink port of switch BX-008-0 to check whether other access network devices are connected under the current access switch. In such as case, the following configurations will be done by server MSS-400 in its table 0:
  "00 0000 0000 0000 1001"=>"000 0000 0001", i.e., a port downlink protocol packet with a destination address (DA) of 0x8000 0x0000 0x0000 0x0009 is oriented to port 0;
  "00 0000 0000 0000 1010"=>"000 0000 0001", i.e., a port downlink protocol packet with a destination address (DA) of 0x8000 0x0000 0x0000 0x000a is oriented to port 0;
  "00 0000 0000 0000 1011"=>"000 0000 0001", i.e., a port downlink protocol packet with a destination address (DA) of 0x8000 0x0000 0x0000 0x000b is oriented to port 0;
  "00 0000 0000 0000 1100"=>"000 0000 0001", i.e., a port downlink protocol packet with a destination address (DA) of 0x8000 0x0000 0x0000 0x000c is oriented to port 0;
  "00 0000 0000 0000 1101"=>"000 0000 0001", i.e., a port downlink protocol packet with a destination address (DA) of 0x8000 0x0000 0x0000 0x000d is oriented to port 0;
  "00 0000 0000 0000 1110"=>"000 0000 0001", i.e., a port downlink protocol packet with a destination address (DA) of 0x8000 0x0000 0x0000 0x000e is oriented to port 0;
  "00 0000 0000 0000 1111"=>"000 0000 0001", i.e., a port downlink protocol packet with a destination address (DA) of 0x8000 0x0000 0x0000 0x000f is oriented to port 0;
  "00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify change BX-008-0 to perform the following configurations in its table 0 via a port allocation packet containing port allocation information:
  "00 0000 0000 0000 1001"=>"00 0000 0001", i.e., a port downlink protocol packet with a destination address (DA) of 0x8000 0x0000 0x0000 0x0009 is oriented to port 0;
  "00 0000 0000 0000 1010"=>"00 0000 0010", i.e., a port downlink protocol packet with a destination address (DA) of 0x8000 0x0000 0x0000 0x000a is oriented to port 1;
  "00 0000 0000 0000 1011"=>"00 0000 0100", i.e., a port downlink protocol packet with a destination address (DA) of 0x8000 0x0000 0x0000 0x000b is oriented to port 2;
  "00 0000 0000 0000 1100"=>"00 0000 1000", i.e., a port downlink protocol packet with a destination address (DA) of 0x8000 0x0000 0x0000 0x000c is oriented to port 3;
  "00 0000 0000 0000 1101"=>"00 0001 0000", i.e., a port downlink protocol packet with a destination address (DA) of 0x8000 0x0000 0x0000 0x000d is oriented to port 4;
  "00 0000 0000 0000 1110"=>"00 0010 0000", i.e., a port downlink protocol packet with a destination address (DA) of 0x8000 0x0000 0x0000 0x000e is oriented to port 5;
  "00 0000 0000 0000 1111"=>"00 0100 0000", i.e., a port downlink protocol packet with a destination address (DA) of 0x8000 0x0000 0x0000 0x000f is oriented to port 6;
  "00 0000 0000 0001 0000"=>"00 1000 0000", i.e., a port downlink protocol packet with a destination address (DA) of 0x8000 0x0000 0x0000 0x0010 is oriented to port 7;

10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; Moreover, items 0x0009 to 0x0010 of the address information table on server MSS-400 are configured as:
  address occupation descriptor: "01" represents that the address is standby;
  device descriptor: it will not be modified;
  device resource description information: it will not be modified;
  The next available address is 0x0011;
11) STB-0 receives a port downlink protocol packet from port 0 of switch BX-008-0 (i.e., a port downlink protocol packet with a destination address of 0x8000 0x0000 0x0000 0x0009); and after receiving a port downlink protocol packet, it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);
12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);
13) After STB-0 receives the network access command and knows that its own access network address is 0x0009, it accesses the network and sends a network access command reply to the server at the same time;
14) After server MSS-400 receives the network access command reply issued by STB-0, it will know that switch STB-0 has accessed the network, then item 0x0009 of the address information table is configured as:
  address occupation descriptor: "10" represents that the address is used;
  device descriptor: "000011" represents a terminal;
  device resource description information: the terminal has a video and audio coding/decoding engine and a 100 M network interface, the type of the terminal is STB, the access network address of a device connected with its network port is 0x0001 (i.e., BX-008-0), and the downlink flow count of its network port is 0;
Item 0x0001 of the address information table is configured as:
  address occupation descriptor: it will not be modified;
  device descriptor: it will not be modified;
  device resource description information: the access switch has 8 downlink 100 M network interfaces defined in turn as port 0 to port 7, 1 CPU module interface defined as port 8 and 1 uplink 100 M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink flow count of each of its network ports is 0;

Then, server MSS-400 sends a device state query instruction to the port each second to check whether STB-0 works normally; when the server does not receive a state query reply in 6 seconds, it will be considered that STB-0 has been removed from the network, and no device state query instruction will be sent any longer; instead, it continues to send a query packet to the current port.

Referring to the above steps 6-14, BX-008-1 may also access the network and obtain its access network address as 0x0002; and STB-1 may also access the network and obtain its access network address as 0x0012.

5. The Service Process of a Node Server, an Ethernet Protocol Translation Gateway and Terminal is as Follows:

5.1 An Example of the Communication Connection Process of a Unicast Communication Service Also as shown in FIG. 9, it is hypothesized that there exists a node server MSS-400 (with an access network address of 0x0000), port 0 thereof is connected with Ethernet protocol translation gateway BX-008-0 (with an access network address of 0x0001), port 1 thereof is connected with Ethernet protocol translation gateway BX-008-1 (with an access network address of 0x0002), and port 0 of BX-008-0 is connected with set-top box STB-0 (with an access network address of 0x0009), port 1 of BX_008-1 is connected with set-top box STB-1 (with an access network address of 0x0012). Set-top box STB_0 issues a request to node server MSS-400 for performing a unicast communication service of visual communication with set-top box STB_1, in the following steps:

S1) Set-Top box STB_0 issues a service request protocol packet, the DA (destination address) of the packet is 0x0800 0x0000 0x0000 0x0000 (i.e., the address of MSS-400), and the SA (source address) is 0x0000 0x0000 0x0000 0x0009; the packet further comprises the MAC address (MAC DA) of Ethernet protocol translation gateway BX-008-0 and the MAC address (MAC SA) of set-top box STB_0; additionally, it may further comprise reserved 0x0000 (reserved word), and the PDU part is as shown in the following table:

TABLE 1

| | | 8e01 | |
|---|---|---|---|
| Field Number | Length | Code | Description |
| 0 | 1 W | 8e01 | user request instruction (source terminal → node server) |
| 1 | 1 W | | service type (service_type) |
| 2-4 | 3 W | | user number (source terminal number) |
| 5 | 1 W | | user extension number (source terminal extension number) |
| 6-31 | 26 W | | service parameter (0 is added to an unoccupied part) |

The program number and the broadcast channel number related to the service request are both put in the service parameter, for example:
  #define SERVICE_TYPE_GTML_REQUEST 0x8000, requesting for a menu
  #define SERVICE_TYPE_VOD_REQUEST 0x8001, requesting for a VOD program
  #define SERVICE_TYPE_CHANGE_MENU 0x8002, requesting for changing background menu
  #define SERVICE_TYPE_BROADCAST_REQUEST 0x8003, requesting for watching broadcast
  #define SERVICE_TYPE_CHANGE_CHANNEL 0x8004, requesting for changing channel define SERVICE_TYPE_TELEPHONE_DIRECT 0x8005, requesting for sending a videophone define SERVICE_TYPE_PERMISSION 0x8006, an reply of whether access is permitted define SERVICE_TYPE_RECORD_REQUEST 0x8007, requesting for recording define SERVICE_TYPE_END_REQUEST 0x8008, requesting for ending the current service define SERVICE_TYPE_ORG_CAST_REQUEST 0x8009, requesting for originating a living broadcast define SERVICE_TYPE_DDB_REQUEST 0x800b, requesting for watching delayed TV define SERVICE_TYPE_SKIP 0x800c, fast forward, fast rewind, pause and continue during the processing of watch a VOD or delayed TV define SERVICE_TYPE_RECORD_END 0x800e, requesting for ending recording define SERVICE_TYPE_VIEW_Monitor_DIRECT 0x8024, requesting for watching monitor define SERVICE_TYPE_RCV_CAST_DIRECT 0x8025, requesting for watching living broadcast define SERVICE_TYPE_TELEPHONE_REQUEST 0, requesting for sending a videophone define SERVICE_TYPE_RCV_CAST_REQUEST 0xa, requesting for watching living broadcast define SERVICE_TYPE_VIEW_Monitor 0xc, requesting for watching monitor

In this example, the service parameter is SERVICE_TYPE_TELEPHONE_REQUEST or SERVICE_TYPE_TELEPHONE_DIRECT.

S2) Ethernet protocol translation gateway BX-008-0 connected between set-top box STB_0 and node server MSS-400 receives the service request protocol packet; firstly, it removes the MAC address (MAC DA) of Ethernet protocol translation gateway BX-008-0 and the MAC address (MAC SA) of set-top box STB_0 in the packet.

Then, according to the configuration of table 1, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply:

Wherein, the menu protocol packet sent to STB 0: DA is 0x8000 0x0000 0x0000 0x0009, SA is 0x0000 0x0000 0x0000 0x0000, reserved is 0x0000, and PDU part is as shown in the following table:

TABLE 2

| Field Number | Length | Code | Description |
| --- | --- | --- | --- |
| 0 | 1 W | 3900 | data download instruction |
| 1 | 1 W | | data type (0 = null, 1 = gtml 2 = gtmlfodder 3 = set-top box program 4 = start menu 5 = bmp 100 = dsp program on gateway 101 = dsp program of 008) |
| 2 | 1 W | | reserved |
| 3 | 1 W | | number of valid packets |
| 4 | 1 W | | sequence number of the current packet |

TABLE 2-continued

| Field Number | Length | Code | Description |
| --- | --- | --- | --- |
| 5 | 1 W | | length of valid data in the current packet |
| 6-14 | 9 W | | reserved |
| 15-526 | 512 W | | data |
| 527 | 1 W | | CRC (summarization of 512 data) |

Menu protocol packet sent to STB_1: DA is 0x8000 0x0000 0x0000 0x0012, SA is 0x0000 0x0000 0x0000 0x0000, reserved is 0x0000, and PDU part is as shown in the above table.

S3) According to the configuration of table 0 on node server MSS-400 and the configuration of table 0 on Ethernet protocol translation gateway BX-008-0 and BX-008-1, these 2 menu protocol packets will be respectively oriented to set-top boxes STB_0 and STB_1, and during this process, BX-008-0 and BX-008-1 add MAC DA and MAC SA to these 2 menu protocol packets respectively.

The called STB_1 issues a request SERVICE_TYPE_PERMISSION for accepting the communication from STB_1 and sends a reply protocol packet to node server MSS-400, wherein the packet contains the MAC address (MAC DA) of Ethernet protocol translation gateway BX-008-1 and the MAC address (MAC SA) of set-top box STB_1, and further, DA is 0x0800 0x0000 0x0000 0x0000, SA is 0x0000 0x0000 0x0000 0x0012, reserved is 0x0000, service parameter is SERVICE_TYPE_PERMISSION, and PDU part is as shown in the following table:

TABLE 3

| 8e01 | | | |
| --- | --- | --- | --- |
| Field Number | Length | Code | Description |
| 0 | 1 W | 8e01 | user request instruction (target terminal →node server) |
| 1 | 1 W | | service type (service_type) |
| 2-4 | 3 W | | user number (source terminal number) |
| 5 | 1 W | | user extension number (source terminal extension number) |
| 6-31 | 26 W | | service parameter (SERVICE_TYPE_PERMISSION) |

S4) Ethernet protocol translation gateway BX-008-1 removes the MAC address (MAC DA) of Ethernet protocol translation gateway BX-008-1 and the MAC address (MAC SA) of set-top box STB_1 in the reply protocol packet, then according to the configuration of table 1, the reply protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 configures its own table 2 as follows:

"10 0000 0000 0001 0010"=>"000 0000 0010", i.e., a unicast data packet with a destination address (DA) of 0x1000 0x0000 0x0000 0x0012 (i.e., set-top box BX-008-1) is oriented to port 1;

"10 0000 0000 0000 1001"=>"000 0000 0001", i.e., a unicast data packet with a destination address (DA) of 0x1000 0x0000 0x0000 0x0009 (i.e., set-top box BX-008-0) is oriented to port 0;

Moreover, node server MSS-400 sends a port configuration command to all Ethernet protocol translation gateways on the uplink (the calling path) and the downlink (the called path), for requesting to open the uplink of the address of the opposite party and the downlink of the address of its own and at the same time.

Two packets sent to Ethernet protocol translation gateway BX-008-0:

1) the first packet: DA is 0x8000 0x0000 0x0000 0x0001, SA is 0x0000 0x0000 0x0000 0x0000, reserved is 0x0000, and PDU part is as shown in the following table:

TABLE 4

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | address of port to be opened: 0x1000 0x0000 0x0000 0x0012 |
| 6 | 1 W | | operation mode: "10 0000 0000", which represents that uplink port 9 is opened |
| 7-10 | 4 W | | 0000 |
| 11 | 1 W | | data type 0x10 |
| 12 | 1 W | | Ethernet protocol translation gateway address (access network address) 0x0001 |
| 13-15 | 3 W | | Ethernet protocol translation gateway device flag |
| 16-31 | 18 W | | 0000 |

2) the second packet: DA is 0x8000 0x0000 0x0000 0x0001, SA is 0x0000 0x0000 0x0000 0x0000, reserved is 0x0000, and PDU part is as shown in the following table:

TABLE 5

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | address of port to be opened: 0x1000 0x0000 0x0000 0x0009 |
| 6 | 1 W | | operation mode: "00 0000 0001", which represents that port 0 is opened |
| 7-10 | 4 W | | 0000 |
| 11 | 1 W | | data type 0x10 |
| 12 | 1 W | | Ethernet protocol translation gateway address (access network address) 0x0001 |
| 13-15 | 3 W | | Ethernet protocol translation gateway device flag |
| 16-31 | 18 W | | 0000 |

Two packets sent to Ethernet protocol translation gateway BX-008-1:

1) the first packet: DA is 0x8000 0x0000 0x0000 0x0002, SA is 0x0000 0x0000 0x0000 0x0000, reserved is 0x0000, and PDU is as shown in the following table:

TABLE 6

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | address of port to be opened: 0x1000 0x0000 0x0000 0x0009 |
| 6 | 1 W | | operation mode: "10 0000 0000", which represents that uplink port 9 is opened |
| 7-10 | 4 W | | 0000 |
| 11 | 1 W | | data type 0x10 |
| 12 | 1 W | | Ethernet protocol translation gateway address (access network address) 0x0002 |
| 13-15 | 3 W | | Ethernet protocol translation gateway device flag |
| 16-31 | 18 W | | 0000 |

2) the second packet: DA is 0x8000 0x0000 0x0000 0x0002, SA is 0x0000 0x0000 0x0000 0x0000, reserved is 0x0000, and PDU is as shown in the following table:

TABLE 7

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | address of port to be opened: 0x1000 0x0000 0x0000 0x0012 |
| 6 | 1 W | | operation mode: "00 0000 0010", which represents that port 1 is opened |
| 7-10 | 4 W | | 0000 |
| 11 | 1 W | | data type 0x10 |
| 12 | 1 W | | Ethernet protocol translation gateway address (access network address) 0x0002 |
| 13-15 | 3 W | | Ethernet protocol translation gateway device flag |
| 16-31 | 18 W | | 0000 |

Packet sent to set-top box STB-0 (service processing command, and coding/decoding command in this example): wherein, DA is 0x8000 0x0000 0x0000 0x0009, SA is 0x0000 0x0000 0x0000 0x0000, reserved is 0x0000, and PDU part is as shown in the following table:

TABLE 8

8704

| Field Number | Length | Code | Description |
|---|---|---|---|
| 0 | 1 W | 8704 | coding/decoding command (node server →source terminal) |
| 1 | 1 W | | to be filled |
| 2-4 | 3 W | | to be filled |
| 5-7 | 3 W | | to be filled |
| 8 | 1 W | | to be filled |
| 9-11 | 3 W | | to be filled |
| 12 | 1 W | | to be filled |
| 13 | 1 W | | 0x3217 |
| 14 | 1 W | | 0x3217 |
| 15-18 | 4 W | | 0x1000 0x0000 0x0000 0x0012 |
| 19-22 | 4 W | | 0x1000 0x0000 0x0000 0x0009 |
| 23 | 1 W | | 0xffff = maintaining the original state |
| 24 | 1 w | | 0 = alarm shut down |

TABLE 8-continued

8704

| Field Number | Length | Code | Description |
|---|---|---|---|
| 25 | 1 W | | 0xffff = maintaining the original state |
| 26 | 1 W | | 0xffff = maintaining the original state |
| 27-31 | 5 w | | 0 |

Packet sent to STB-1 (service processing command, and coding/decoding command in this example):

wherein, DA is 0x8000 0x0000 0x0000 0x0012, SA is 0x0000 0x0000 0x0000 0x0000, reserved is 0x0000, and PDU part is as shown in the following table:

TABLE 9

8704

| Field Number | Length | Code | Description |
|---|---|---|---|
| 0 | 1 W | 8704 | coding/decoding command (node server →target terminal) |
| 1 | 1 W | | to be filled |
| 2-4 | 3 W | | to be filled |
| 5-7 | 3 W | | to be filled |
| 8 | 1 W | | to be filled |
| 9-11 | 3 W | | to be filled |
| 12 | 1 W | | to be filled |
| 13 | 1 W | | 0x3217 |
| 14 | 1 W | | 0x3217 |
| 15-18 | 4 W | | 0x1000 0x0000 0x0000 0x0009 |
| 19-22 | 4 W | | 0x1000 0x0000 0x0000 0x0012 |
| 23 | 1 W | | 0xffff = maintaining the original state |
| 24 | 1 w | | 0 = alarm shut down |
| 25 | 1 W | | 0xfff = maintaining the original state |
| 26 | 1 W | | 0xffff = maintaining the original state |
| 27-31 | 5 w | | 0 |

In the PDU of the above coding/decoding command, field number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: HB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

TABLE 10

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on Ethernet protocol translation gateways BX-008-0 and BX-008-1, the above 4 packets sent to the Ethernet protocol translation gateways will be respectively oriented to BX-008-0 and BX-008-1.

In such a case, Ethernet protocol translation gateway BX-008-0 configures its own table 2 as follows:

"10 0000 0000 0001 0010"=>"10 0000 0000", i.e., a unicast data packet with a destination address (DA) of 0x1000 0x0000 0x0000 0x0012 is oriented to port 9;

"10 0000 0000 0000 1001"=>"00 0000 0001", i.e., a unicast data packet with a destination address (DA) of 0x1000 0x0000 0x0000 0x0009 is oriented to port 0;

Ethernet protocol translation gateway BX-008-1 configures its own table 2 as follows:

"10 0000 0000 0001 0010"=>"00 0000 0010", i.e., a unicast data packet with a destination address (DA) of 0x1000 0x0000 0x0000 0x0012 is oriented to port 1;

"10 0000 0000 0000 1001"=>"10 0000 0000", i.e., a unicast data packet with a destination address (DA) of 0x1000 0x0000 0x0000 0x0009 is oriented to port 9;

According to the configuration of table 0 on node server MSS-400 and the configuration of table 0 on Ethernet protocol translation gateways BX-008-0 and BX-008-1, the latter 2 packets sent to the set-top box will be respectively oriented to set-top boxes STB-0 and STB-1. During this process, BX-008-0 and BX-008-1 will respectively add the corresponding MAC DA and MAC SA into the 2 packets. After receiving the packet, set-top boxes STB-0 and STB-1 may start coding/decoding according to the content of the packet, and receive and send unicast data.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein the packet contains the MAC address (MAC DA) of Ethernet protocol translation gateway BX-008-0 and the MAC address (MAC SA) of set-top box STB_0, wherein DA of the packet is 0x1000 0x0000 0x0000 0x0012, and SA is 0x0000 0x0000 0x0000 0x0009;

2) The unicast data packet enters Ethernet protocol translation gateway BX-008-0, and firstly, the MAC DA and MAC SA are removed, then an switching engine module of Ethernet protocol translation gateway BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x1000 0x0000 0x0000 0x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x1000 0x0000 0x0000 0x0012 is oriented to port 1), which represents that downlink port 1 is opened, and the current unicast data packet enters Ethernet protocol translation gateway BX-008-1 via port 1;

4) Ethernet protocol translation gateway BX-008-1 receives the unicast data packet, its switching engine module looks up in table 2 according to a combined address field, wherein the table address is "10 0000 0000 0001 0010", the output of the item is "00 0000 0010" ("10 0000 0000 0001 0010"=>"00 0000 0010", i.e., a unicast data packet with a destination address (DA) of 0x1000 0x0000 0x0000 0x0012 is oriented to port 1), which represents that downlink port 1 is opened, and the current unicast data packet enters set-top box STB-1 via port 1; and during this process, BX-008-1 adds the MAC address (MAC SA) of Ethernet protocol translation gateway BX-008-1 and the MAC address (MAC DA) of set-top box STB-1 into the packet.

5) Set-top box STB-1 sends a unicast data packet to set-top box STB-0, wherein DA of the packet is 0x1000 0x0000 0x0000 0x0009, and SA is 0x0000 0x0000 0x0000 0x0012; the packet further contains the MAC address (MAC DA) of Ethernet protocol translation gateway BX-008-1 and the MAC address (MAC SA) of set-top box STB_1;

6) The unicast data packet enters Ethernet protocol translation gateway BX-008-1, and firstly, the MAC DA and MAC SA are removed, then an switching engine module of Ethernet protocol translation gateway BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e., a unicast data packet with a destination address (DA) of 0x1000 0x0000 0x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x1000 0x0000 0x0000 0x0009 is oriented to port 0), which represents that downlink port 0 is opened, and the current unicast data packet enters Ethernet protocol translation gateway BX-008-0 via port 0;

8) Ethernet protocol translation gateway BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x1000 0x0000 0x0000 0x0009 is oriented to port 0), which represents that downlink port 0 is opened, and the current unicast data packet enters set-top box STB-0 via port 0. During this process, BX-008-0 adds the MAC address (MAC SA) of Ethernet protocol translation gateway BX-008-0 and the MAC address (MAC DA) of set-top box STB-0 into the packet.

An simple example in which unicast service communication is realized in the above process:

It is hypothesized that STB-0 requests to server MSS-400 for sending a videophone to STB-1, and the service request packet sent by STB-0 to MSS-400 contains the type of the service requested (which is videophone in this example, so it contains the number of the opposite party, for example, 8888 8888 8888)

After server MSS-400 receives the service request packet, it checks the service type and knows that the service type is videophone, and then it skips to the videophone service process; according to the number of the opposite party (8888 8888 8888), server MSS-400 may obtain the access network address of STB-1 (because at the time STB-1 accesses the network, server MSS-400 will update the content of CAM and update address 0x0012 to 8888 8888 8888) by looking up in the CAM; the topology information of STB-0 and STB-1 may be known by looking up in the address information table according to the access network address of STB-0 and STB-1, and from 0x0009, it may be know that STB-0 is connected with Port 0 of BX-008-0, and the uplink and downlink flow is 0, the link flow is 100 Mbit/s; the access network address of BX-008-0 is 0x0001, and it may be known by looking up in the address information table that BX-008-0 is connected with port 0 of MSS-400, the uplink and downlink flow is 0, and the link flow is 100 Mbit/s; the link flow information of STB-1 may be known by the same token, and the uplink and downlink bandwidth that requests for videophone is 2 Mbit/s, which meets the requirement; and then other information is checked, if it meets the requirement, the server opens the paths directed to said 2 paths of unicast data of all switches between the called set-top box and the calling set-top box (including address matching and accurate flow control on Port 0 of BX-008-0 and Port 1 of BX-008-1), the link flow information for looking up in the address information table is modified, and the server sends a coding/decoding command to the two parties of set-top boxes.

5.2 An Example of the Communication Connection Process of a Multicast Communication Service Again referring to FIG. 9, it is hypothesized that there exists a node server MSS-400 (with an access network address of 0x0000), port 0 thereof is connected with Ethernet protocol translation gateway BX-008-0 (with an access network address of 0x0001), port 1 thereof is connected with Ethernet protocol translation gateway BX-008-1 (with an access network address of 0x0002), and port 0 of BX-008-0 is connected with set-top box STB-0 (with an access network address of 0x0009), the number of STB_0 is 0x6666 0x6666 0x6666, port 1 of BX 008-1 is connected with set-top box STB-1 (with an access network address of 0x0012), and the number of STB_1 is 0x8888 0x8888 0x8888. Set-top box STB_0 requests to node server MSS-400 for initiating living broadcast in the following steps:

1) Set-top box STB_0 issues a service request protocol packet for initiating living broadcast, which contains the MAC address (MAC DA) of Ethernet protocol translation gateway BX-008-0 and the MAC address (MAC SA) of set-top box STB_0, wherein DA of the packet is 0x0800 0x0000 0x0000 0x0000, SA is 0x0000 0x0000 0x0000 0x0009, reserved is 0x0000 (reserved word), and the PDU part is as shown in the following table:

TABLE 11

| | 8e01 | | |
|---|---|---|---|
| Field Number | Length | Code | Description |
| 0 | 1 W | 8e01 | terminal request instruction (terminal → node server) |
| 1 | 1 W | | service type (service_type) |
| 2-4 | 3 W | | terminal number (number of requestor) 0000 |
| 5 | 1 W | | terminal extension number (extension number of requestor) 0000 |
| 6-31 | 26 W | | #define SERVICE_TYPE_ORG_CAST_REQUEST 0x8009, requesting for originating a living broadcast |

2) Ethernet protocol translation gateway BX-008-0 connected between set-top box STB_0 and node server MSS-400 receives the service request protocol packet; firstly, it removes the MAC address (MAC DA) of Ethernet protocol translation gateway BX-008-0 and the MAC address (MAC SA) of set-top box STB_0 in the packet.

Then, according to the configuration of table 1, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, knows the link topology related to the current service according to its internal address information table, and it determines that the link is permitted and living broadcast may be initiated, then it allocates a multicast address of 0x0008. Moreover, the node server sends a port configuration command to all Ethernet protocol translation gateways on the current communication link, for requesting to open the uplink of the address of the opposite party and the downlink of the address of its own and at the same time. At this point, it knows that only Ethernet protocol translation gateway BX-008-0 needs to be configured at present by link topology determination.

In such a case, node server MSS-400 sends a packet to Ethernet protocol translation gateway BX-008-0;

wherein, DA is 0x8000 0x0000 0x0000 0x0001, SA is 0x0000 0x0000 0x0000 0x0000, reserved is 0x0000 (reserved word), and the PDU part is as shown in the following table:

TABLE 12

| | | 8b54 | |
|---|---|---|---|
| Field Number | Length | Code | Description |
| 0 | 1 W | 8b54 | Ethernet protocol translation gateway port configuration command (node server ->Ethernet protocol translation gateway) |
| 1 | 1 W | | device type (BX-008) |
| 2-5 | 4 W | | 0x7800 0x0000 0x0000 0x0008 |
| 6 | 1 W | | "00 0000 0001", which represents that port 0 is opened |
| 7-10 | 4 W | | 0000 |
| 11 | 1 W | | data type 0x78 |
| 12 | 1 W | | Ethernet protocol translation gateway address (access network address) 0x0001 |
| 13-15 | 3 W | | Ethernet protocol translation gateway device flag |
| 16-31 | 18 W | | 0000 |

Node server MSS-400 sends a packet to set-top box STB-0 (service processing command, and coding/decoding command in this example):

wherein, DA is 0x8000 0x0000 0x0000 0x0009SA is 0x0000 0x0000 0x0000 0x0000, reserved is 0x0000, and PDU part is as shown in the following table:

TABLE 13

| | | 8704 | |
|---|---|---|---|
| Field Number | Length | Code | Description |
| 0 | 1 W | 8704 | coding/decoding command (node server →set-top box) |
| 1 | 1 W | | to be filled |
| 2-4 | 3 W | | to be filled |
| 5-7 | 3 W | | to be filled |
| 8 | 1 W | | to be filled |
| 9-11 | 3 W | | to be filled |
| 12 | 1 W | | to be filled |
| 13 | 1 W | 0x3217 | |
| 14 | 1 W | 0x3217 | |
| 15-18 | 4 W | | 0x7800 0x0000 0x0000 0x0008 |
| 19-22 | 4 W | | 0x7800 0x0000 0x0000 0x0008 |

TABLE 13-continued

| | | 8704 | |
|---|---|---|---|
| Field Number | Length | Code | Description |
| 23 | 1 W | 0xffff | = maintaining the original state |
| 24 | 1 w | 0 | = alarm shut down |
| 25 | 1 W | 0xffff | = maintaining the original state |
| 26 | 1 W | 0xffff | = maintaining the original state |
| 27-31 | 5 w | 0 | |

3) According to the configuration of table 0 on node server MSS-400, the packet sent to Ethernet protocol translation gateway BX-008-0 will be oriented to BX-008-0. In such a case, BX-008-0 configures its own table 3 as follows:

"11 0000 0000 0000 1000"=>"00 0000 0001", i.e., a multicast data packet with a destination address (DA) of 0x7800 0x0000 0x0000 0x0008 is oriented to port 0;

4) According to the configuration of table 0 on node server MSS-400 and the configuration of table 0 on Ethernet protocol translation gateway BX-008-0, the packet sent to set-top box STB-0 will be oriented to STB-0. During this process, BX-008-0 adds the MAC (MAC SA) of BX-008-0 and the MAC (MAC DA) of STB-0 into the packet and sends it. STB-0 starts coding/decoding according to the content of the packet, and starts receiving and sending multicast data.

Specifically, the process in which set-top box STB-0 initiates a communication link to receive and send multicast data based on the current living broadcast is as follows:

1) Set-top box STB-0 issues a multicast data packet, wherein the packet contains the MAC (MAC DA) of BX-008-0 and the MAC (MAC SA) of STB-0, wherein DA of the packet is 0x7800 0x0000 0x0000 0x0008 (multicast address), and SA is 0x0000 0x0000 0x0000 0x0009;

2) The multicast data packet enters Ethernet protocol translation gateway BX-008-0, and firstly, the MAC DA and MAC SA are removed, then an switching engine module of Ethernet protocol translation gateway BX-008-0 looks up in table 3 according to a combined address field, wherein the table address is "11 0000 0000 0000 1000", the output of the item is "00 0000 0001" ("11 0000 0000 0000 1000"=>"00 0000 0001", i.e., a multicast data packet with a destination address (DA) of 0x7800 0x0000 0x0000 0x0008 is oriented to port 0), which represents that downlink port 0 is opened, and the current multicast data packet enters set-top box STB-0 via port 0. During this process, BX-008-0 further adds the MAC (MAC SA) of BX-008-0 and the MAC (MAC DA) of STB-0 into the packet, and sends the packet via port 0.

Set-top box STB_1 requests to node server MSS-400 for watching living broadcast in the following steps, with a number of 0x6666 0x6666 0x6666:

1) Set-top box STB_1 issues a service request protocol packet for watching living broadcast, wherein the packet contains the MAC (MAC DA) of BX-008-1 and the MAC (MAC SA) of STB_1, wherein DA of the packet is 0x0800 0x0000 0x0000 0x0000, SA is 0x0000 0x0000 0x0000 0x0012, reserved is 0x0000, and PDU part is as shown in the following table:

TABLE 14

8e01

| Field Number | Length | Code | Description |
|---|---|---|---|
| 0 | 1 W | 8e01 | user request instruction (terminal →node server) |
| 1 | 1 W | | service type (service_type) |
| 2-4 | 3 W | | terminal number (number of requestor) 0x6666 0x6666 0x6666 |
| 5 | 1 W | | terminal extension number (extension number of requestor) 0000 |
| 6-31 | 26 W | | #define SERVICE_TYPE_RCV_CAST_DIRECT 0x8025, requesting for watching living broadcast |

2) Ethernet protocol translation gateway BX-008-1 connected between set-top box STB_1 and node server MSS-400 firstly removes the MAC DA and MAC SA, and then according to the configuration of table 1, node server MSS-400 determines that a request for watching living broadcast is received according to the content of the packet, knows that the initiator (source terminal) is STB_0 by looking up in a CAM table according to the service number, knows the link topology related to the current service according to its internal address information table, and it determines that the link is permitted and living broadcast may be watched, thus it allocates a multicast address (corresponding to the multicast address allocated to the source terminal) of 0x0008. Moreover, the node server sends a port configuration command to all Ethernet protocol translation gateways on the current communication link, for requesting to open the uplink of the address of the opposite party and the downlink of the address of its own and at the same time. In such a case, node server MSS-400 configures its own table 3 as follows:

"11 0000 0000 0000 1000"=>"000 0000 0010", i.e., a multicast data packet with a destination address (DA) of 0x7800 0x0000 0x0000 0x0008 is oriented to port 1;

At the same time, node server MSS-400 sends a packet to Ethernet protocol translation gateway BX-008-0:

wherein, DA is 0x8000 0x0000 0x0000 0x0001, SA is 0x0000 0x0000 0x0000 0x0000, reserved is 0x0000, and PDU part is as shown in the following table:

TABLE 15

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | 0x7800 0x0000 0x0000 0x0008 |
| 6 | 1 W | | "10 0000 0001", which represents that port 9 is opened |
| 7-10 | 4 W | | 0000 |
| 11 | 1 W | | data type 0x78 |
| 12 | 1 W | | Ethernet protocol translation gateway address (access network address) 0x0001 |
| 13-15 | 3 W | | Ethernet protocol translation gateway device flag |
| 16-31 | 18 W | | 0000 |

At the same time, node server MSS-400 sends a packet to Ethernet protocol translation gateway BX-008-1:

wherein, DA is DA is 0x8000 0x0000 0x0000 0x0002, SA is 0x0000 0x0000 0x0000 0x0000, reserved is 0x0000, and PDU part is as shown in the following table:

TABLE 16

8b54

| Field Number | Length | Code | Description |
|---|---|---|---|
| 0 | 1 W | 8b54 | Ethernet protocol translation gateway port configuration command (node server →Ethernet protocol translation gateway) |
| 1 | 1 W | | device type (BX-008) |
| 2-5 | 4 W | | 0x7800 0x0000 0x0000 0x0008 |
| 6 | 1 W | | "00 0000 0010" represents port 1 |
| 7-10 | 4 W | | 0000 |
| 11 | 1 W | | data type 0x78 |
| 12 | 1 W | | Ethernet protocol translation gateway (access network address) 0x0002 |
| 13-15 | 3 W | | Ethernet protocol translation gateway device flag |
| 16-31 | 18 W | | 0000 |

At the same time, node server MSS-400 sends a packet to set-top box STB-1:

wherein, DA is DA is 0x8000 0x0000 0x0000 0x0012, SA is 0x0000 0x0000 0x0000 0x0000, reserved is 0x0000, and PDU part is as shown in the following table:

TABLE 17

8704

| Field Number | Length | Code | Description |
|---|---|---|---|
| 0 | 1 W | 8704 | coding/decoding command (node server →terminal) |
| 1 | 1 W | | to be filled |
| 2-4 | 3 W | | to be filled |
| 5-7 | 3 W | | to be filled |
| 8 | 1 W | | to be filled |
| 9-11 | 3 W | | to be filled |
| 12 | 1 W | | to be filled |
| 13 | 1 W | | 0 |
| 14 | 1 W | | 0x3217 |
| 15-18 | 4 W | | 0xffff |
| 19-22 | 4 W | | 0x7800 0x0000 0x0000 0x0008 |
| 23 | 1 W | | 0xffff = maintaining the original state |
| 24 | 1 w | | 0 = alarm shut down |
| 25 | 1W | | 0xffff = maintaining the original state |
| 26 | 1 W | | 0xffff = maintaining the original state |
| 27-31 | 5 w | | 0 |

3) According to the configuration of table 0 on node server MSS-400, the packets sent to Ethernet protocol translation gateways BX-008-0 and BX-008-1 will be respectively oriented to Ethernet protocol translation gateways BX-008-0 and BX-008-1.

In such a case, Ethernet protocol translation gateway BX-008-0 configures its own table 3 as follows:

"11 0000 0000 0000 1000"=>"10 0000 0001", i.e., a multicast data packet with a destination address (DA) of 0x7800 0x0000 0x0000 0x0008 is oriented to port 0 and port 9;

Ethernet protocol translation gateway BX-008-1 configures its own table 3 as follows:

"11 0000 0000 0000 1000"=>"00 0000 0010", i.e., a multicast data packet with a destination address (DA) of 0x7800 0x0000 0x0000 0x0008 is oriented to port 1;

4) According to the configuration of table 0 on node server MSS-400 and the configuration of table 0 on Ethernet protocol translation gateway BX-008-1, the packet sent to set-top box STB-1 will be oriented to STB-1. STB-1 receives multicast data and decodes the data according to the content of the packet. BX-008-1 will add the MAC (MAC SA) of BX-008-1 and the MAC (MAC DA) of STB-1 into the packet and then send the packet.

Specifically, the process in which set-top box STB-1 receives multicast data based on the current communication link on which living broadcast is watched is as follows:

1) Set-top box STB-0 issues a multicast data packet, wherein the packet contains the MAC address (MAC DA) of Ethernet protocol translation gateway BX-008-0 and the MAC address (MAC SA) of set-top box STB_0, wherein DA of the packet is 0x7800 0x0000 0x0000 0x0008 (multicast address), and SA is 0x0000 0x0000 0x0000 0x0009;

2) The multicast data packet enters Ethernet protocol translation gateway BX-008-0, and firstly, the MAC DA and MAC SA are removed, then an switching engine module of Ethernet protocol translation gateway BX-008-0 looks up in table 3 according to a combined address field, wherein the table address is "11 0000 0000 0000 1000", the output of the item is "10 0000 0001" ("11 0000 0000 0000 1000"=>"10 0000 0001", i.e., a multicast data packet with a destination address (DA) of 0x7800 0x0000 0x0000 0x0008 is oriented to port 0 and port 9), which represents that downlink port 0 and uplink port 9 are opened, and the current multicast data packet enters set-top box STB-0 via port 0, and enters node server MSS-400 via port 9;

wherein, BX-008-0 adds the MAC address (MAC SA) of BX-008-0 and the MAC address (MAC DA) of set-top box STB_0 to the packet that enters set-top box STB-0 via port 0.

3) After node server MSS-400 receives the multicast data packet, its switching engine module looks up in table 3 according to a combined address field, wherein the table address is "11 0000 0000 0000 1000", the output of the item is "000 0000 0010" ("11 0000 0000 0000 1000"=>"000 0000 0010", i.e., a multicast data packet with a destination address (DA) of 0x7800 0x0000 0x0000 0x0008 is oriented to port 1), which represents that downlink port 1 is opened, the current multicast data packet enters Ethernet protocol translation gateway BX-008-1 via port 1;

4) After Ethernet protocol translation gateway BX-008-1 receives the multicast data packet, its switching engine module looks up in table 3 according to a combined address field, wherein the table address is "11 0000 0000 0000 1000", the output of the item is "00 0000 0010" ("11 0000 0000 0000 1000"=>"00 0000 0010", i.e., a multicast data packet with a destination address (DA) of 0x7800 0x0000 0x0000 0x0008 is oriented to port 1), which represents that downlink port 1 is opened, the current multicast data packet enters set-top box STB-1 via port 1. The MAC (MAC SA) of BX-008-1 and the MAC (MAC DA) of STB-1 are added into the packet.

Of course, the above unicast service communication process and multicast service communication process are used as examples. In practice, any kind of the unicast service communication or multicast service communication can be performed by using the embodiment of the invention.

6. Flow Control of an Ethernet Protocol Translation Gateway

Figure 10:
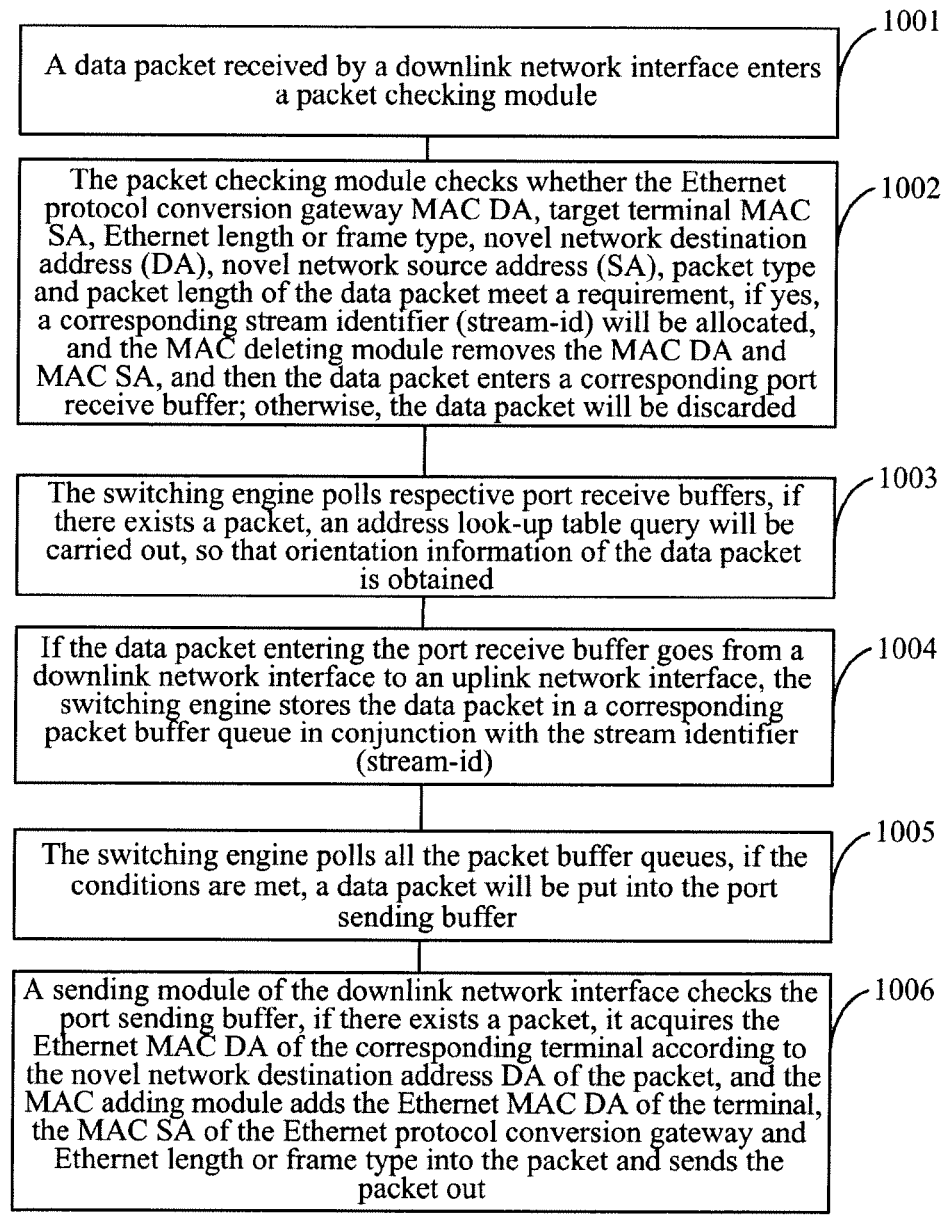
FIG. 10 is a flow chart showing the process in which an Ethernet protocol translation gateway performs flow control according to an embodiment of the invention.

The Ethernet protocol translation gateway may also performs accurate flow control on a packet or a protocol packet passing through it. Referring to FIG. 10, the process is as follows:

Step 1001: A data packet received by a downlink network interface enters a packet checking module;

Step 1002: The packet checking module checks whether the Ethernet protocol translation gateway MAC DA, target terminal MAC SA, Ethernet length or frame type, novel network destination address (DA), novel network source address (SA), packet type and packet length of the data packet meet a requirement, if yes, a corresponding stream identifier (stream-id) will be allocated, and the MAC deleting module removes the MAC DA and MAC SA, and then the data packet enters a corresponding port receive buffer otherwise, the data packet will be discarded;

However, a data packet received by the uplink network interface directly enters the corresponding port receive buffer, and a data packet received by the CPU module interface also directly enters the corresponding port receive buffer. This is because that only uplink forwarding is controlled in this embodiment. Therefore, the data packets received by the uplink network interface and the CPU module interface will not be checked.

In this embodiment, stream identifier (stream-id) may be of 8 bit, which corresponds to 256 streams.

Step 1003: The switching engine polls respective port receive buffers, if there exists a packet, an address look-up table query will be carried out, so that orientation information of the data packet is obtained;

The packet address table will be looked up for a data packet; if it is a unicast data packet, table 2 will be looked up, and if it is a multicast data packet, table 3 will be looked up.

Step 1004: If the data packet entering the port receive buffer goes from a downlink network interface to an uplink network interface, the switching engine stores the data packet in a corresponding packet buffer queue in conjunction with the stream identifier (stream-id); if the packet buffer queue is to be full, the data packet is discarded;

If the data packet entering the port receive buffer does not go from a downlink network interface to an uplink network interface (for example, it goes from an uplink network interface to a downlink network interface, or goes from a CPU module interface to a downlink network interface, etc.), the switching engine stores the data packet in a corresponding packet buffer according to the orientation information of the packets; if the packet buffer queue is to be full, the packets are discarded;

In the packet buffer, it is hypothesized that there exist 256 stream types, then there may be 256 buffers, for buffering the data packets corresponding different streams respectively.

The above describes the receiving part of a packet, and the sending part of a packet will be described below.

Step 1005: An switching engine polls all the packet buffer queues, which may be divided into the following two situations:

First Situation: if the queue goes from a downlink network interface to an uplink network interface, it will be forwarded when the following conditions are met:

1) the port sending buffer is not full;
2) the count of the packet counter in the queue is larger than 0; and
3) a token generated by a code rate control module is obtained;

wherein, so-called forwarding represents that a packet is read by the switching engine from the packet buffer queue sequentially, and then written into the port sending buffer of the uplink network interface.

Second Situation: if the queue does not go from a downlink network interface to an uplink network interface, it will be forwarded when the following conditions are met:

1) the port sending buffer is not full; and
2) the count of the packet counter in the queue is larger than 0.

Step 1006: A sending module of the downlink network interface checks the port sending buffer, if there exists a packet, it acquires the Ethernet MAC DA of the corresponding terminal according to the novel network destination address DA of the packet, and the MAC adding module adds the Ethernet MAC DA of the terminal, the MAC SA of the Ethernet protocol translation gateway and Ethernet length or frame type into the packet and sends the packet out.

The sending module of the uplink network interface checks the sending buffer of the port, if there exists a packet, it sends the packet.

In this embodiment, the Ethernet protocol translation gateway is based on a storing-forwarding mechanism, all ports have a receive buffer and a sending buffer, and these buffers are set inside the switch chip, so they cannot be too large, and the size of each receive buffer or sending buffer is between 2 kbyte to 4 kbyte, which can buffer about 2 to 3 maximum Ethernet packet (about 1556 bytes). However, these buffers are not enough, so packet buffers need to be added outside the switch chip, and grain packet buffers such as SDRAM and SRAM, etc., are usually employed; for example, a 16-Mbyte SDRAM may be used as a packet buffer, which may store 10K maximum Ethernet packets (about 1556 bytes). So-called port sending buffer not full represents that the port sending buffer can at least store a further maximum Ethernet packet (about 1556 bytes), thus it may guarantee that no sending buffer will be overflown.

The process in which a code rate control module generates a token will be illustrated in detail below according to an example.

A code rate control module of an access network switch configures a group of counters for each stream, which are respectively defined as follows:

| | |
|---|---|
| bit (68) = op | '0'--->reset, '1'--->normal |
| bit (67 downto 60) = frame_cnt | 0-255 |
| bit (59 downto 50) = frame_4byte | −511-511 |
| bit (49 downto 41) = max_frame_4byte | 0-511 |
| bit (40 downto 32) = add_4byte | 0-511 |
| bit (31 downto 16) = timer_set | |
| bit (15 downto 0) = timer_cnt | | bit (68) = op, when op = '0', it represents that the counter is initialized as zero; when op = '1', it represents a normal operation.

bit (67 downto 60)=frame_cnt, it represents the packet count in the packet buffer queue, which is hypothesized as 8 bit (0-255);

bit (59 downto 50)=frame_4byte, it represents the number of bytes that may be sent (it should be noted that frame_4byte is a 4-byte counter, and it is hypothesized that frame_4byte=4, which represents that the number of bytes that may be sent is 16, and at the same time, the counter may be negative, which is hypothesized here as 10 bit, so the range is −511-511);

bit (49 downto 41)=max_frame_4byte, it represents the maximum value of the number of bytes that may be sent, which is hypothesized here as 9 bit (0-511);

bit (40 downto 32)=add_4byte, it represents the number of bytes that may be sent, which is added each time a fixed time elapses (it should be noted that add_4byte is a 4-byte counter, and It is hypothesized that add_4byte=4, which represents that the added number of bytes that may be sent is 16, which is hypothesized here as 9 bit, so the range is 0-511);

bit (31 downto 16)=timer_set, it represents a time interval that is set, it is hypothesized that the system query period is 50 us, if timer_set=100, it represents that the time interval that is set will be 50 us×100=5 ms, which is hypothesized here as 16 bit;

bit (15 downto 0)=timer_cnt, it represents a system query period counter, it is hypothesized that the system query period is 50 us, it represents that timer_cnt is increased by 1 each 50 us, which is hypothesized here as 16 bit.

It is hypothesized that there are totally 256 streams, then 256 groups of counters will be maintained in the code rate control module. The processing time of the code rate control module on each group of counters is 10 clock cycles, the frequency of the system clock is 125 MHz, that is, the clock cycle is 8 ns. Then, the time needed to processing 256 groups of counters will be 256×10×8 ns=20480 ns=20.48 us, and it is hypothesized that the system query period is 50 us, then a very large redundancy exists.

For easy description, it is hypothesized here that the counter of the 50$^{th}$ stream is respectively set as follows:
timer_set=100,
add_4byte=16,
frame_4byte=−10,
max_frame_4byte=400,
frame_cnt=2.

The code rate control module checks the counter of the 50$^{th}$ stream, if timer_cnt=timer_set (100), which represents that the packet sending time is found according to the time interval that is set, then frame_4byte=frame_4byte+add_4byte, and it determines whether frame_4byte is larger than max_frame_4byte, if Yes, frame_4byte=max_frame_4byte. In the above example, frame_4byte=frame_4byte+add_4byte=−10+16=6, which is less than max_frame_4byte (400).

Then, if frame_4byte is larger than 0 and frame_cnt is larger than 0, the code rate control module sends a token to the switching engine (in the example, the token number is 50). The switching engine takes a packet from the corresponding packet buffer queue (in this example, packet buffer queue 50) according to the token number, and sends it; and at the same time, it returns the packet length to the code rate control module. The code rate control module subtracts the corresponding packet length from frame_4byte, it is hypothesized that the packet length frame_length=20 (an integral multiple of 4 byte), then frame_4byte=frame_4byte−frame_length=6−20=−14.

The above counters op, max_frame_4byte, add_4byte and timer_set will be flow control information, which are all configured by the CPU module (which are obtained by its protocol interaction with the node server). timer_cnt is initialized as 0, and it is increased by 1 each time a system query period elapses; frame_cnt is initialized as 0, and if a packet is added to the packet buffer queue, frame_cnt will be increased by 1. The code rate control module may convert a nonuniform data flow that is input into a uniform data flow for sending by controlling the parameters of max_frame_4byte, add_4byte, timer_set. For example, if it needs to output a data flow with a packet length of 1024 byte and an interval of 5 ms, it sets as follows:
max_frame_4byte=256 (1024 byte),
add_4byte=256 (1024 byte),
timer_set=100 (it is hypothesized that system query period is 50 μs).

It can be known from the above that, for different services, the corresponding flow will be different, then the flow control information obtained by the CPU module from the node server will be different, too. Moreover, the above code rate control not only can control a packet with a fixed packet length, but also can control a packet with a variable packet length, wherein a packet with a variable packet length represents that the packet length is variable each time it is input into the switch. This is because that the data size that can be sent each time is determined by the maximum value max_frame_4byte of byte that can be sent and the parameter add_4byte for adjusting the sending of a packet with a variable packet length.

More specifically, the above process in which an Ethernet protocol translation gateway carries out flow control will be illustrated by an example in conjunction with the above 5.1 Unicast Communication Process.

In 5.1, it illustrates in detail a process in which node server MSS-400 sends a protocol packet and completes table configuration, and notifies each Ethernet protocol translation gateway on the communication link of the current service to open the corresponding port. Preferably, in the communication route setting process for the current service, the node server MSS-400 may also realize the transfer of flow control information by sending a protocol packet, that is, it sends the flow control information for the current service to the first Ethernet protocol translation gateway BX-008-0 on the uplink from set-top box STB-0 to set-top box STB-1, and Ethernet protocol translation gateway BX-008-0 performs flow control on the data of the current service.

Because when node server MSS-400 sets a route for the current service, it determines the flow occupied by the current service (i.e., the flow allocated to the current service) according to the attribute information of the current service, such as type and so on at the same time, and records it in the device resource description information in the address information table of node server MSS-400 (i.e., the flow occupied the current service is increased in the flow information of the port). Thus, at the time the next service request is issued, it may know the actual flow of the port.

The reason that node server MSS-400 sends flow control information to switch BX-008-0 is to ensure that the flow allocated to the current service by the node server MSS-400 can guarantee the implementation, rather than randomly increasing or reducing (including the change in the sense of bandwidth statistics and the change of bandwidth on discrete time points).

Flow control information may guarantee that a packet may be sent according to a certain time interval when switch BX-008-0 receives a packet of the current service, and a requirement is also laid on the size of data sent each time. When the length of a packet sent by the terminal is large, two or more time intervals may be accumulated for sending the packet, thus the user packet will not be dismantled or disassembled, and at the same time, it can also guarantee the stability and uniformity of data transmission basically. However, in the invention, preferably, the switch and the terminal may be notified to limit the packet length when a service is established, for example, the length of the packet initiated by a terminal will meet the requirement of flow control information, and at the same time, the switch may also discard a packet that does not meet the packet length requirement, thus the stability and uniformity of data transmission may be further guaranteed.

In a word, it may guarantee via flow control information that the data flow sent by switch BX-008-0 at each moment is stable and uniform and meet the flow limit allocated, and it will not be changed at random. Thus, it can guarantee that accurate flow allocation and control on each service and each port of the network may be realized in the invention.

However, in the invention, in order to guarantee accurate flow control, a flow control may also be performed on a protocol packet for requesting a service. Specifically, node server MSS-400 may assign flow control information to bottom-layer switches of an access terminal, that is, when each switch receives an uplink protocol packet, it only needs to perform data transmission according to the flow control information informed by node server MSS-400 when the current switch is powered on and accesses the network. Thus, the invention may guarantee that the flow distribution of the whole network will not be influenced even if a large amount of service request protocol packets are initiated at the same time; that is, the invention can perform flow control on the service request process, and it can also perform flow control on the data transmission process in which a service link has been established.

In the multicast link establishment process of 5.2, it also relates to the setting, recording and notifying of flow control information of a port in the above unicast service, and the implementation process and the technical theory are basically the same, so it will not be described again here.

7. The Definition of Data Format During the Network Access Process of an Ethernet Protocol Translation Gateway, an Access Switch and a Terminal The information interaction mode between the user terminal and the server is PDU, and both use Raw Socket to transfer PDU, the data format of which is as follows:

TABLE 18

| Destination Address | Source Address | Reserved Byte | PDU |
|---|---|---|---|
| 4W | 4W | 2BYTE | 32W or 528W |

System message (PDU) definition:

Port query instruction which is send by the server and is a short instruction of 32 W:

TABLE 19

| Field Number | Length | Code | Description |
|---|---|---|---|
| 0 | 1 W | 8A01 | port query instruction of server |
| 1-4 | 4 W | | network address |
| 5-7 | 3 W | | system clock |
| 8-9 | 2 W | | IP address of gateway (this field is only valid for terminal) |
| 10-12 | 3 W | | MAC address of gateway (this field is only valid for terminal) |
| 13-31 | 19 W | 0000 | to be filled |

Port query reply instruction which is a short instruction of 32 W:

The STB receives the reply transmitted from 8A01 to the server

TABLE 20

| Field Number | Length | Code | Description |
|---|---|---|---|
| 0 | 1 W | 8A03 | port query reply instruction of UE |
| 1 | 1 W | | device type (0x2131) |
| 2-4 | 3 W | | terminal device identifier (different for each terminal) |
| 5-8 | 4 W | | network address (obtained form 8A01) |
| 9-11 | 3 W | 0000 | UE number (fill 0) |
| 12 | 1 W | 0000 | UE extension number (fill 0) |
| 13-15 | 3 W | | terminal version information (used to distinguish position of STB program in server) |
| 16-31 | 16 W | 0000 | to be filled |

The switch receives the reply transmitted from 8A01 to the server

TABLE 21

| Field Number | Length | Code | Description |
|---|---|---|---|
| 0 | 1 W | 8A02 | port query reply instruction of switch |
| 1 | 1 W | | device type |
| 2-4 | 3 W | | device identifier (different for each switch) |
| 5-8 | 4 W | | network address (obtained form 8A01) |
| 9 | 1 W | | rated flow of main line (inherent in switch) |
| 10 | 1 W | | rated flow of branch line (inherent in switch) |
| 11-13 | 3 W | | version information (inherent in switch) |
| 14-31 | 18 W | 0000 | fill 0 |

The encoding plate receives the reply transmitted from 8A01 to the server

TABLE 22

| Field Number | Length | Code | Description |
|---|---|---|---|
| 0 | 1 W | 8A06 | port query reply instruction of encoding plate |
| 1 | 1 W | | device type (0x5131) |
| 2-4 | 3 W | | device identifier (different for each) |
| 5-8 | 4 W | | network address (obtained form 8A01) |
| 9-31 | 23 W | 0000 | to be filled |

Device identifier: it can be valued temporarily as 0x5131 0201 000X (X=0–f)

Network access instruction which is send by the server and is a short instruction of 32 W:

TABLE 23

| Field Number | Length | Code | Description |
|---|---|---|---|
| 0 | 1 W | 8A11 | network access instruction of server |
| 1 | 1 W | | device type |
| 2-4 | 3 W | | device identifier |
| 5-8 | 4 W | | network address |
| 9-11 | 3 W | | device number and UE number |
| 12 | 1 W | | UE extension number, or dedicated HOP number of TWG |
| 13-31 | 19 W | 0000 | to be filled |

Network access confirmation instruction which is a short instruction of 32 W:

TABLE 24

| Field Number | Length | Code | Description |
|---|---|---|---|
| 0 | 1 W | 8A12 | network access confirmation instruction |
| 1 | 1 W | | device type |
| 2-4 | 3 W | | device identifier |
| 5-10 | 6 W | | device model number (supplementary information, ASCII code) |
| 11-13 | 3 W | | UE number (obtained form 8A11) |
| 14 | 1 W | | UE extension number (obtained form 8A11) |
| 15-18 | 4 W | | network address (obtained form 8A01) |
| 19-31 | 13 W | 0000 | to be filled |

State query instruction which is send by the server and is a short instruction of 32 W:

The state query instruction transmitted to the switch

TABLE 25

| Field Number | Length | Code | Description |
|---|---|---|---|
| 0 | 1 W | 8A21 | state query instruction of switch |
| 1 | 1 W | | device type |
| 2-4 | 3 W | | device identifier |
| 5-8 | 4 W | | network address |
| 9 | 1 W | | device number |
| 10-12 | 3 W | | real-time clock (maintained by server) |
| 13-17 | 5 W | | to be filled |
| 18-19 | 2 W | | IP address (useful only for gateway) |
| 20-22 | 3 W | | MAC address (useful only for gateway) |
| 23 | 1 W | | serial number of MAC (useful only for gateway) |
| 24-31 | 8 W | | to be filled |

The state query instruction transmitted to the STB

TABLE 26

| Field Number | Length | Code | Description |
|---|---|---|---|
| 0 | 1 W | 8A31 | state query instruction of STB |
| 1-4 | 4 W | | network address |
| 5-7 | 3 W | | real-time clock (maintained by server) |
| 8-10 | 3 W | | STB number |
| 11-31 | 21 W | 0000 | to be filled |

State query reply instruction which is a short instruction of 32 W:

State query reply of the switch

TABLE 27

| Field Number | Length | Code | Description |
|---|---|---|---|
| 0 | 1 W | 8A22 | state query reply instruction of switch |
| 1 | 1 W | | device type |
| 2-4 | 3 W | | device identifier |
| 5-6 | 2 W | | to be filled |
| 7 | 1 W | | device number |
| 8 | 1 W | | to be filled |
| 9 | 1 W | | working state of switch |
| 10 | 1 W | | temperature |
| 11 | 1 W | | actual uplink measured flow of main line |
| 12 | 1 W | | actual downlink measured flow of main line |
| 13-31 | 19 W | | to be filled |

State query reply of the STB

TABLE 28

| Field Number | Length | Code | Description |
|---|---|---|---|
| 0 | 1 W | 8A23 | state query reply instruction of UE |
| 1 | 1 W | | device type |
| 2-4 | 3 W | | device identifier |
| 5-7 | 3 W | | UE number |
| 8 | 1 W | | UE extension number |
| 9 | 1 W | | state of terminal device (= 0 normally) |
| 10 | 1 W | | environment temperature of UE |
| 11 | 1 W | | type of device connected by terminal |
| 12 | 1 W | | on-off state of device connected by terminal, 0 = off, and 1 = on |
| 13-30 | 18 W | | the same as 11-12 |
| 31 | 1 W | | CRC |

State query reply of the encoding plate

TABLE 29

| Field Number | Length | Code | Description |
|---|---|---|---|
| 0 | 1 W | 8A26 | state query reply instruction of encoding plate |
| 1 | 1 W | | device type |
| 2-4 | 3 W | | device identifier |
| 5-7 | 3 W | | device number |
| 8 | 1 W | | to be filled |
| 9 | 1 W | | working state of encoding plate |
| 10 | 1 W | | temperature of encoding plate |
| 11-31 | 21 W | | to be filled |

In conclusion, the present invention has the following several sufficient conditions for realizing network-wide QoS:

Firstly, the mechanism about "Best Efforts" in the core theories of IP Internet will certainly cause network flow non-uniformity and frequent packet loss. In fact, TCP protocol just utilizes the packet loss state of the network to adjust the transmission flow.

Secondly, the mechanism about "Store & Forward" in the core theories of IP Internet will cause a greater non-uniformity of network flow at the next node at the time it absorbs the local burst flow.

Thirdly, the mechanism about "Error Detection & Retransmission" in the core theories of IP Internet will cause an intolerable delay in synchronous video communication, thus it has no use value.

Fourthly, successional network flow non-uniformity or burst flow will certainly cause periodic switch (router) packet loss.

Thus it can be seen that, because the computer file burst flow is discrete in essence and has no subsequent burst flows, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered by the inventor that the current various QoS methods are all based on an error hypothesis. According to this hypothesis, the QoS solution is to provide a privilege of being processed preferentially to video flow. But in fact, because the network flow needed by different media forms is extremely non-uniform, video flow will be the absolute main body on the network so long as a few users use a video service.

Seen from another viewpoint, providing a good quality especially to a majority of the network flows is equivalent to providing a poor quality especially to a minority of the non-video flows. Since a majority of the network flows must require QoS, why not provide QoS to the remaining minority of service flows that does not require QoS? It is hypothesized that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:

a switch is set on the entrance ramp of the highway for controlling the macroscopic traffic flow;

the driving speed is kept stable, thereby improving the traffic rate; and road isolations of a concrete structure and flyover crossings, rather than policemen and traffic lights, are employed to restrict vehicle driving.

The embodiments of the invention conform to theory of telephone networks and take three measures similar to those of the above highway:

the flow on each path is calculated and measured, once the flow is to be saturated, it will be bypassed, or new users will be rejected;

strict uniform-flow transmission is performed, and in the embodiments of the invention, a packet loss rate of 1/1,000,000 can be attained in TV under a heavy-load flow of 90%; and uplink data matching and flow control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:

a price-performance ratio that is a hundredfold of that of IP Internet;

a method for developing high-quality symmetrical TV without interfering with the existing IP Internet service.

Especially on a large-flow backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the flow is occupied 100 percent. Theoretically, a uniform flow will be obtained after a plurality of uniform flows are combined. It has been further proved by practice that under the premise of a uniform flow, the network flow may reach its limit value, with no packet loss phenomenon appears. Because the video media flow, which occupies over ninety percent of the further network flow, has the characteristics of a uniform flow, in the present that takes video service as the main object, the approach to guaranteeing Internet QoS is of course to eliminate source flow non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media flow of any bandwidth may be obtained by only changing the time interval of packet transmission. To guarantee the uniform-flow characteristic of the network, it is required by the Internet of the invention that terminal designing must have a uniform-flow ability. However, in the practical network environment, it cannot expect that all the users autonomously comply with the uniform-flow specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

The advantages of the novel network with crucial control functions which is compatible in the invention will be further described below by comparing with IP Internet. The provision of the Ethernet protocol translation gateway in the invention can assist the novel network to achieve its advantages, because the current Ethernet local area network can be used directly, without restructuring the whole network.

1) Impersonation may be prevented fundamentally on network address structure.

A user device informs the network of its IP Internet address; but in the invention, the network informs the user device of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the novel network of the invention, the address of a terminal is learnt via network management protocol, and the user terminal can only access the novel network of the invention via this address that is learnt. Therefore, it can be ensured without authentication. A detailed description thereof may refer to network management protocol. The novel network of the invention creates a "colored" address system with an ordered structure (D/SCAF). The novel network address of the invention not only has uniqueness, but also has a function of being locatable and characterizable; for example, similar to ID card number, it implies the geographic position of user port, device attribute, service right and other characteristics. A switch on the novel network of the invention specifies a rule of conduct for the packets according to these characteristics, thus data distribution with different attribute may be realized.

2) An independent passport is issued for each service, so that the path for hacker attack and virus diffusion can be blocked.

A user can enter and exit the IP Internet freely, and a user prepares a firewall by himself/herself; but in the novel network of the invention, a passport must be requested for each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the novel network of the invention, after a user accesses the network, the network switch only allows the user to issue limited service requests to a node server, and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding a content with a copyright that is downloaded from the network (which is set by a content provider).

Passive measures such as firewall, antivirus, encryption and isolation between internet and intranet, etc., will not be needed on the novel network of the invention, and the novel network of the invention blocks the approach of hacker attack and virus diffusion on the network structure. Therefore, it may be secure network essentially.

3) Network device and user data are completely isolated, thus the lifeline of virus and Trojan can be cut off.

An IP Internet device may dismantle a user packet freely; but the novel network device of the invention is completely isolated from the user data. That is, during data transmission, a novel network device (for example, switch and gateway, etc.) does not dismantle user packet; instead, it looks up in a mapping table according to the packet address, and then forwards it from the corresponding port. That is, the switch of the invention does not have the function of route calculation and selection.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the novel network of the invention, it is impossible for the CPUs of all servers and switch devices to touch the user packet of any user. That is, the whole novel network of the invention only establishes a transparent pipeline with specified flow and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempts to be a hacker or make a virus will have no object to attack.

4) Free connection between users are completely isolated, so that effective management may be ensured.

IP Internet is a free market and has no middleman; the novel network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the novel network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5) Commercial rules are implanted into the communication protocol to ensure a profit-gaining mode;

IP Internet follows a mode of communication first; while the novel network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the novel network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the novel network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

Various embodiments in the specification are described progressively, the focal point of each embodiment is different from that of other embodiments, and the same or similar parts among various embodiments can be referred each other. For the system embodiments, since they are basically similar to the method embodiments, they are described simply and reference may be made to the related description of the method embodiments.

Finally, it should be noted that, in this specification, relation terms such as first, second and so on are only used to distinguish one entity or operation from another entity or operation, rather than requiring or implying that such an actual relation or sequence exists between these entities or operations.

An Ethernet-compatible data transmission method, an Ethernet protocol translation gateway, a node server and an Ethernet-compatible communication system according to the invention have been described in detail above. Theory and embodiment of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

The invention claimed is:

1. An Ethernet-compatible data transmission method for a new network, wherein the new network is a network with a centralized control function, a terminal is connected to the new network via an Ethernet, and the method comprises:
  accessing, by an Ethernet protocol translation gateway, the new network, and obtaining an MAC address of a terminal bound to the Ethernet protocol translation gateway from a node server with a centralized control function;
  receiving, by the Ethernet protocol translation gateway, a data packet transmitted from the new network, adding an MAC address of the Ethernet protocol translation gateway and an MAC address of a target terminal into the data packet, and then transmitting the data packet to the Ethernet; and
  receiving, by the Ethernet protocol translation gateway, a data packet transmitted from the Ethernet, removing the MAC address of the Ethernet protocol translation gateway and an MAC address of a source terminal from the data packet, and then transmitting the data packet to the new network,
  wherein both the target terminal and the source terminal comply with new network protocols;
  wherein accessing, by the Ethernet protocol translation gateway, the new network comprises:
  issuing, by a node server with a centralized control function in the new network, a query packet;
  receiving, by the Ethernet protocol translation gateway, the query packet after being powered on and initialized, and returning a reply packet containing a serial number of the Ethernet protocol translation gateway;
  looking up, by the node server, information of the Ethernet protocol translation gateway corresponding to the serial number in a registration information table, wherein the information of the Ethernet protocol translation gateway includes the MAC address of the Ethernet protocol translation gateway and the MAC address of the terminal bound to the Ethernet protocol translation gateway;
  transmitting, by the node server, a network access command to the Ethernet protocol translation gateway, wherein the network access command contains an address of the Ethernet protocol translation gateway in the new network and the MAC address of the Ethernet protocol translation gateway; and
  returning, by the Ethernet protocol translation gateway, a reply after receiving the network access command, and accessing, by the Ethernet protocol translation gateway, the new network; and
  after accessing, by the Ethernet protocol translation gateway, the new network, the method further comprises:
  notifying, by the node server, the Ethernet protocol translation gateway of the MAC address of the terminal bound to the Ethernet protocol translation gateway,
  wherein binding relation between the MAC address of the terminal and the Ethernet protocol translation gateway is preset in the node server when the terminal and the Ethernet protocol translation gateway are sold.

2. The method of claim 1, wherein:
  the data packet, into which the MAC address of the Ethernet protocol translation gateway and the MAC address of the target terminal are added, is transmitted in the Ethernet by using Ethernet protocols;
  the data packet, from which the MAC address of the Ethernet protocol translation gateway and the MAC address of the source terminal are removed, is transmitted in the new network by using the new network protocols;
  packet headers of the data packet transmitted from the new network and the data packet transmitted from the Ethernet both contain addresses of two transmitting ends in the new network, wherein the addresses are a source address and a destination address of the data packet; and
  after accessing, by the Ethernet protocol translation gateway, the new network, the method further comprises:
  obtaining, from the node server, a mapping between the MAC address of the terminal bound to the Ethernet protocol translation gateway and an address of the terminal in the new network; and
  receiving, by the Ethernet protocol translation gateway, the data packet transmitted from the new network, and adding an MAC address of a corresponding target terminal into the data packet according to a mapping between the destination address of the data packet and the MAC address.

3. The method of claim 2, wherein after receiving, by the Ethernet protocol translation gateway, the data packet transmitted from the Ethernet and before removing the MAC address of the Ethernet protocol translation gateway and the MAC address of the source terminal from the data packet, the method further comprises:
  detecting the received data packet, and allocating a corresponding stream identifier if detection requirements are met;
  the detecting comprises:
  detecting whether the MAC address of the Ethernet protocol translation gateway, the MAC address of the source terminal, the destination address, the source address, data packet type and packet length meet requirements; and
  after removing the MAC address of the Ethernet protocol translation gateway and the MAC address of the source terminal from the data packet and before transmitting the data packet, the method further comprises:
  putting the data packet into a corresponding port receive buffer according to the stream identifier;
  reading the data packet from the port receive buffer, and putting the data packet into a packet buffer queue of corresponding stream according to the stream identifier;
  polling the packet buffer queue, and after generating a transmitting token, reading sequentially data packets from the packet buffer queue of the corresponding stream according to a stream identifier in the transmitting token, and putting the data packets into a port transmit buffer; and
  reading a data packet from the port transmit buffer, and transmitting the data packet.

4. The method of claim 3, wherein before reading sequentially the data packets from the packet buffer queue of the corresponding stream according to the stream identifier in the transmitting token and putting the data packets into the port transmit buffer, the method further comprises:
  judging whether the following two conditions are met simultaneously:
  firstly, the port transmit buffer is not full, and
  secondly, count of a packet counter in the packet buffer queue of the corresponding stream is larger than zero; and
  reading sequentially the data packets from the packet buffer queue of the corresponding stream according to the stream identifier in the transmitting token, and putting the data packets into the port transmit buffer, if the two conditions are meet simultaneously; and generating the transmitting token comprises:
generating, by a node server with a centralized control function in the new network, flow control information according to the service request protocol packet initiated by the terminal, and transmitting the flow control information to an uplink Ethernet protocol translation gateway for flow control, wherein the flow control information includes a transmitting time interval and transmitted data size; and
generating, by the Ethernet protocol translation gateway, the transmitting token according to the flow control information, wherein the token contains a stream identifier.

5. The method of claim 4, wherein:
the transmitted data size in the flow control information includes a maximum value of bytes which can be transmitted and parameters for adjusting the transmitting of a packet with variable length;
generating, by the node server, the flow control information comprises:
checking, by the node server, whether remaining flow resources of the uplink and downlink for the service both meet flow resources required by the service, if so, generating flow control information corresponding to the service; otherwise, rejecting the service request; and
before the checking, the method further comprises:
maintaining, by the node server, an address information table, in which new network address occupation information, device description information and device resource description information are recorded, wherein the device resource description information includes new network addresses of devices connected to respective network ports of the device and uplink and downlink flow count of the respective network ports of the device; and
obtaining, by the node server, the uplink and downlink corresponding to the service according to the new network addresses of the devices connected to the respective network ports of the device in the address information table; and obtaining the remaining flow resources of the uplink and downlink for the service according to the uplink and downlink flow count of the respective network ports of the device.

6. The method of claim 1, wherein after receiving, by the Ethernet protocol translation gateway, the network access command, the method further comprises:
setting a protocol packet address table in the Ethernet protocol translation gateway, wherein the table comprising the information for orienting protocol packets received by the Ethernet protocol translation gateway to corresponding ports of the Ethernet protocol translation gateway respectively,
wherein the protocol packet includes the query packet issued by the node server; and
after accessing, by the Ethernet protocol translation gateway, the new network and obtaining the MAC address of the Ethernet protocol translation gateway and the MAC address of the terminal bound to the Ethernet protocol translation gateway, the method further comprises:
accessing, by the terminal bound to the Ethernet protocol translation gateway, the new network, which specifically comprises the following steps:
issuing, by a node server with a centralized control function in the new network, a query packet;
receiving, by the Ethernet protocol translation gateway, the query packet, orienting the query packet to a corresponding port according to the protocol packet address table, and then adding the MAC address of the Ethernet protocol translation gateway and the MAC address of the target terminal into the query packet and forwarding the query packet;
receiving, by the terminal, the query packet after being powered on and initialized, and returning a reply packet containing a serial number of the terminal;
removing, by the Ethernet protocol translation gateway, the MAC address of the Ethernet protocol translation gateway and the MAC address of the terminal from the reply packet, and then forwarding the reply packet to the node server;
finding, by the node server, in the registration information table, terminal information corresponding to the serial number of the terminal, and transmitting a network access command, wherein the network access command contains the address of the terminal in the new network;
receiving, by the Ethernet protocol translation gateway, the network access command, adding the MAC address of the Ethernet protocol translation gateway and the MAC address of the target terminal, and then forwarding the network access command; and
returning, by the terminal, a reply after receiving the network access command, removing, by the Ethernet protocol translation gateway, the MAC address of the Ethernet protocol translation gateway and the MAC address of the terminal from the reply and then forwarding the reply to the node server, and accessing, by the terminal, the new network.

7. The method of claim 1, wherein after accessing, by the Ethernet protocol translation gateway, the new network, the method further comprises:
initiating, by the source terminal, a service request protocol packet, which contains the MAC address of the Ethernet protocol translation gateway and the MAC address of the source terminal; and
removing, by the Ethernet protocol translation gateway, the MAC address of the Ethernet protocol translation gateway and the MAC address of the source terminal from the service request protocol packet, and then forwarding the service request protocol packet to the new network;
the method further comprises:
acquiring, by the node server, uplink and downlink transmission paths for the service according to the service request protocol packet, and transmitting configuration information of the uplink and downlink transmission paths to Ethernet protocol translation gateways on the uplink and downlink transmission paths respectively; and
setting, by the Ethernet protocol translation gateways on the uplink and downlink transmission paths, their respective data packet address tables according to the configuration information,
wherein the data packet address tables comprises information for orienting data packets received by the Ethernet protocol translation gateways to corresponding ports; and
when data transmission is unidirectional transmission, the Ethernet protocol translation gateway bound to the source terminal sets a data packet address table for uplink transmission, and the Ethernet protocol translation gateway bound to the target terminal sets a data packet address table for downlink transmission; or when data transmission is bidirectional transmission, the Ethernet protocol translation gateway bound to the source terminal sets a data packet address table for uplink and downlink transmission, and the Ethernet protocol translation gateway bound to the target terminal also sets a data packet address table for uplink and downlink transmission.

8. The method of claim 7, wherein:

the Ethernet protocol translation gateway receives the data packet transmitted from the new network, queries the data packet address table, orients the data packet to a corresponding port, and adds the MAC address of the Ethernet protocol translation gateway and the MAC address of the target terminal and then transmits the data packet; and the Ethernet protocol translation gateway receives the data packet transmitted from the Ethernet, removes the MAC address of the Ethernet protocol translation gateway and the MAC address of the source terminal from the data packet, queries the data packet address table, orients the data packet to a corresponding port and then transmits the data packet;

after obtaining, by the node server, the configuration information of the transmission paths, the method further comprises:

when access switches of the new network are further included between the node server and the Ethernet protocol translation gateway, transmitting, by the node server, the configuration information of the transmission paths to the access switches on the uplink and downlink transmission paths, and setting, by the access switches, their respective data packet address tables according to the configuration information, wherein the data packet address tables comprises information for orienting data packets received by the access switches to corresponding ports; and acquiring, by the node server, the uplink and downlink transmission paths for the service comprises:

maintaining, by the node server, an address information table, in which new network address occupation information, device description information and device resource description information are recorded, wherein the device resource description information includes new network addresses of devices connected to respective network ports of the device; and acquiring, by the node server, the uplink and downlink transmission paths corresponding to the service according to the new network addresses of the devices connected to respective network ports of the device in the address information table.

9. The method of claim 8, further comprising:

accessing, by the access switch, the new network, which specifically comprises the following steps:

issuing, by a node server with a centralized control function in the new network, a query packet;

receiving, by the access switch, the query packet after being powered on and initialized, and returning a reply packet containing a serial number of the access switch;

looking up, by the node server, in the registration information table, access switch information corresponding to the serial number, and transmitting a network access command, wherein the network access command contains an address of the access switch in the new network; and returning, by the access switch, a reply after receiving the network access command, and accessing the new network.

10. The method of claim 1, further comprising:

receiving, by the Ethernet protocol translation gateway, a service request protocol packet, detecting the MAC address of the Ethernet protocol translation gateway, the MAC address of the source terminal, the destination address, the source address, data packet type and packet length for the service request protocol packet, and putting the service request protocol packet into a corresponding port receive buffer if detection requirements are met;

reading a protocol packet from the port receive buffer, and putting the protocol packet into a corresponding packet buffer queue;

polling the packet buffer queue, and if a port transmit buffer is not full and count of a packet counter in the packet buffer queue is larger than zero, reading sequentially protocol packets from the packet buffer queue at a predefined time interval and putting the protocol packets into the port transmit buffer; and reading a protocol packet from the port transmit buffer, and transmitting the protocol packet.

11. An Ethernet-compatible Ethernet protocol translation gateway for a new network, wherein the Ethernet protocol translation gateway accesses the new network and is connected with a terminal via an Ethernet, the new network is a network with a centralized control function, and the Ethernet protocol translation gateway comprises a memory and one or more processors, wherein the memory stores therein computer readable program codes, and the one or more processors are configured to execute the computer readable program codes to implement:

obtaining an MAC address of a terminal bound to the Ethernet protocol translation gateway from a node server with a centralized control function after accessing the new network;

receiving a data packet transmitted from the new network, adding an MAC address of the Ethernet protocol translation gateway and an MAC address of a target terminal into the data packet, and then transmitting the data packet to the Ethernet; and receiving a data packet transmitted from the Ethernet, removing the MAC address of the Ethernet protocol translation gateway and an MAC address of a source terminal from the data packet, and then transmitting the data packet to the new network, wherein both the target terminal and the source terminal comply with new network protocols;

wherein obtaining an MAC address of a terminal bound to the Ethernet protocol translation gateway from a node server with a centralized control function after accessing the new network comprises:

receiving, after being powered on and initialized, a query packet issued by the node server;

returning a reply packet containing a serial number of the Ethernet protocol translation gateway;

receiving a network access command transmitted from the node server after the node server finds information of the Ethernet protocol translation gateway corresponding to the serial number in a registration information table, wherein the information of the Ethernet protocol translation gateway includes the MAC address of the Ethernet protocol translation gateway and the MAC address of the terminal bound to the Ethernet protocol translation gateway, and the network access command contains an address of the Ethernet protocol translation gateway in the new network and the MAC address of the Ethernet protocol translation gateway; and returning a reply after receiving the network access command, and accessing the Ethernet protocol translation gateway in the new network; and receiving, after accessing the new network, the MAC address of the terminal bound to the Ethernet protocol translation gateway transmitted from the node server, wherein binding relation between the MAC address of the terminal and the Ethernet protocol translation gateway is preset in the node server when the terminal and the Ethernet protocol translation gateway are sold.

12. The Ethernet protocol translation gateway of claim 11, wherein:

the data packet, into which the MAC address of the Ethernet protocol translation gateway and the MAC address of the target terminal are added, is transmitted in the Ethernet by using Ethernet protocols;

the data packet, from which the MAC address of the Ethernet protocol translation gateway and the MAC address of the source terminal are removed, is transmitted in the new network by using the new network protocols;

packet headers of the data packet transmitted from the new network and the data packet transmitted from the Ethernet both contain addresses of two transmitting ends in the new network, wherein the addresses are a source address and a destination address of the data packet; and the one or more processors are further configured to execute the computer readable program codes to implement:

obtaining, from the node server, a mapping between the MAC address of the terminal bound to the Ethernet protocol translation gateway and an address of the terminal in the new network after the Ethernet protocol translation gateway accesses the new network; and then receiving the data packet transmitted from the new network, and adding an MAC address of a corresponding target terminal into the data packet according to a mapping between the destination address of the data packet and the MAC address.

13. The Ethernet protocol translation gateway of claim 12, the one or more processors are further configured to execute the computer readable programs to implement:

detecting the received data packet, and allocating a corresponding stream identifier if detection requirements are met, wherein detecting the received data packet comprises detecting whether the MAC address of the Ethernet protocol translation gateway, the MAC address of the source terminal, the destination address, the source address, data packet type and packet length meet requirements; and wherein the one or more processors are further configured to execute the computer readable program codes to implement:

storing a corresponding data packet according to the stream identifier;

storing a data packet read from the port receive buffer;

storing a data packet read from the packet buffer; and reading a data packet from the port receive buffer and putting the data packet into a packet buffer queue of corresponding stream according to the stream identifier; polling the packet buffer queue, and after obtaining a transmitting token, reading sequentially data packets from the packet buffer queue of the corresponding stream according to the stream identifier in the transmitting token, and putting the data packets into the port transmit buffer; and reading a data packet from the port transmit buffer and transmitting the data packet.

14. The Ethernet protocol translation gateway of claim 11, the one or more processors are further configured to execute the computer readable programs to implement:

setting a protocol packet address table in the Ethernet protocol translation gateway after receiving the network access command, wherein the table is adapted to orient protocol packets received by the Ethernet protocol translation gateway to corresponding ports of the Ethernet protocol translation gateway respectively, wherein the protocol packet includes the query packet issued by the node server; and the one or more processors are further configured to execute the computer readable program codes to implement:

receiving the query packet issued by the node server and orienting the query packet to a corresponding port according to the protocol packet address table during the process in which the terminal bound to the Ethernet protocol translation gateway accesses the new network.

* * * * *